US012152444B2

(12) United States Patent
MacKarvich

(10) Patent No.: US 12,152,444 B2
(45) Date of Patent: Nov. 26, 2024

(54) LADDER DOCK

(71) Applicant: Charles J. MacKarvich, Atlanta, GA (US)

(72) Inventor: Charles J. MacKarvich, Atlanta, GA (US)

( * ) Notice: Subject to any disclaimer, the term of this patent is extended or adjusted under 35 U.S.C. 154(b) by 0 days.

(21) Appl. No.: 17/890,999

(22) Filed: Aug. 18, 2022

(65) Prior Publication Data

US 2022/0389760 A1 Dec. 8, 2022

Related U.S. Application Data

(63) Continuation of application No. 17/075,879, filed on Oct. 21, 2020, now Pat. No. 11,492,849.

(60) Provisional application No. 62/969,388, filed on Feb. 3, 2020, provisional application No. 62/968,705, filed on Jan. 31, 2020.

(51) Int. Cl.

*E06C 7/48* (2006.01)
*A62B 35/00* (2006.01)
*E06C 7/18* (2006.01)
*E06C 1/06* (2006.01)

(52) U.S. Cl.

CPC .............. *E06C 7/48* (2013.01); *A62B 35/005* (2013.01); *E06C 7/186* (2013.01); *E06C 1/06* (2013.01)

(58) Field of Classification Search

CPC . E06C 7/186; E06C 7/48; E06C 7/486; A62B 35/005; A01M 31/02; B60R 9/0423
See application file for complete search history.

(56) References Cited

U.S. PATENT DOCUMENTS 1,467,597 A * 9/1923 Elof .......................... E06C 7/48 182/214
1,470,489 A 10/1923 Schuh
2,140,828 A 12/1938 Carle
(Continued)

FOREIGN PATENT DOCUMENTS

AT 398228 10/1994
DE 202013006653 10/2013
(Continued)

OTHER PUBLICATIONS

US 11,261,665 B2, 03/2022, MacKarvich (withdrawn)
(Continued)

*Primary Examiner* — Colleen M Chavchavadze
(74) *Attorney, Agent, or Firm* — Buchalter

(57) ABSTRACT

A ladder dock can include a planar mounting panel, the mounting panel configured to contact and be secured to a surface of an elevated structure; and a planar connecting panel, the connecting panel extending from the mounting panel and angled with respect to the mounting panel, the connecting panel angled upward with respect to the mounting panel by a bend angle, an angle between the mounting panel and the connecting panel being less than 180 degrees, the connecting panel defining first and second ears, each of the first and second ears extending in a direction away from the mounting panel, each of the first and second ears being coplanar with the connecting panel, the first and second ears defining a ladder notch therebetween, the ladder notch sized to receive and fix a position of a ladder relative to the ladder dock, the ladder dock being formed from a single blank.

16 Claims, 19 Drawing Sheets

(56) References Cited

U.S. PATENT DOCUMENTS 2,526,071 A 10/1950 Estey
2,845,206 A * 7/1958 Currie .................. E04F 21/1855 294/142
3,012,626 A 12/1961 Marryatt
3,100,026 A 8/1963 Sunshine
3,115,211 A 12/1963 Ostrander, Jr.
3,523,591 A 8/1970 Fountain
3,598,200 A 8/1971 Thompson
3,902,700 A 9/1975 Cox
3,908,791 A 9/1975 Kleine et al.
3,910,378 A 10/1975 Nyman
4,085,818 A 4/1978 Swager
RE30,072 E 8/1979 Kleine et al.
4,193,475 A 3/1980 Sweet et al.
4,399,890 A 8/1983 Bartels et al.
4,546,855 A 10/1985 Lyons
4,709,783 A 12/1987 Tomioka et al.
4,765,439 A 8/1988 Kresmery
4,813,515 A * 3/1989 Wigington .............. E06C 7/486 248/48.2
5,165,642 A * 11/1992 Rihaly .................... E04D 15/02 248/237
5,265,696 A 11/1993 Casebolt
5,497,848 A 3/1996 Travis
5,664,640 A 9/1997 Smith
5,743,356 A 4/1998 Mitchell
D401,354 S * 11/1998 LaValle .......................... D25/68
5,845,741 A 12/1998 Dwyer
5,911,287 A 6/1999 Campbell
5,918,698 A 7/1999 Lunn
5,934,408 A 8/1999 Flux
5,975,242 A * 11/1999 Woller .................. A01M 31/02 182/135
5,992,564 A 11/1999 Kirkpatrick et al.
D426,896 S * 6/2000 Brown ........................... D25/69
6,161,647 A 12/2000 Braden et al.
6,244,551 B1 6/2001 Fletcher
6,296,105 B1 10/2001 Carnes
6,533,069 B1 3/2003 Couillard
6,578,665 B1 * 6/2003 DeBaca .................... E06C 1/34 182/214
6,722,469 B1 4/2004 Weger, Jr.
6,769,513 B2 8/2004 Pettit
6,907,957 B1 6/2005 Couch
6,926,120 B1 8/2005 Bradley
7,044,270 B1 5/2006 McIntire et al.
7,066,299 B1 6/2006 Fleming
7,093,689 B2 8/2006 Poldmaa
7,600,610 B2 10/2009 Deuer
7,637,350 B2 12/2009 Conroy
7,950,497 B2 5/2011 Horton
7,992,681 B2 8/2011 Anderson et al.
8,074,769 B2 12/2011 Sraric et al.
D669,194 S 10/2012 Meyer et al.
8,353,387 B2 1/2013 Vollenweider et al.
8,602,163 B2 12/2013 Davis, Jr.
8,783,415 B2 7/2014 Bancroft
8,839,907 B2 9/2014 Davis, Jr.
D715,964 S 10/2014 Von Hebestreit
8,875,839 B1 11/2014 Licea et al.
9,080,383 B2 7/2015 Meillet
9,194,129 B2 * 11/2015 O'Donnell ............ E04G 21/328
9,500,028 B2 11/2016 Cale
9,540,875 B2 1/2017 Ellis
9,784,034 B2 10/2017 Short
D810,960 S 2/2018 Umlor
9,988,842 B2 6/2018 Moss et al.
D830,577 S 10/2018 Umlor
10,486,002 B1 11/2019 Drinkwater
D872,879 S * 1/2020 Lenci ............................. D25/68
D884,924 S * 5/2020 Lenci ............................. D25/68
10,883,310 B2 1/2021 Johnson et al.
10,940,338 B1 3/2021 Miller et al.
11,021,316 B2 * 6/2021 Castro .................... B65D 19/38
11,085,238 B1 8/2021 Bancroft
11,125,016 B2 * 9/2021 Adams ....................... E06C 7/48
11,136,824 B2 * 10/2021 James, Jr. ............... E06C 7/505
11,313,174 B2 4/2022 MacKarvich
11,492,849 B2 11/2022 MacKarvich
11,719,042 B1 8/2023 MacKarvich
2003/0213646 A1 * 11/2003 Gallion ..................... E06C 7/14 182/129
2003/0230389 A1 12/2003 Savard et al.
2005/0045421 A1 3/2005 Gaines
2006/0000674 A1 1/2006 McIntire et al.
2007/0023232 A1 * 2/2007 Eastwood ................. E06C 5/00 182/127
2007/0158137 A1 7/2007 Petersen
2007/0278037 A1 * 12/2007 Michel ...................... E06C 7/48 182/45
2008/0190692 A1 8/2008 Feik
2008/0202850 A1 8/2008 Anderson et al.
2009/0000868 A1 1/2009 Gaines
2010/0012424 A1 1/2010 Krauss
2010/0326768 A1 12/2010 Kerstetter, Jr.
2012/0080263 A1 4/2012 Lee
2013/0233993 A1 9/2013 Striepling
2015/0075907 A1 3/2015 Moss et al.
2015/0204140 A1 7/2015 Umlor et al.
2015/0226002 A1 8/2015 Johansen
2015/0252619 A1 9/2015 Kramer
2016/0208555 A1 7/2016 Dehoff et al.
2017/0058604 A1 3/2017 Minette et al.
2017/0058605 A1 3/2017 Napolitano
2018/0274295 A1 9/2018 Adams et al.
2019/0169934 A1 6/2019 Adams
2019/0257152 A1 8/2019 MacKarvich
2019/0330921 A1 10/2019 James, Jr.
2019/0338593 A1 11/2019 Knickrehm et al.
2021/0046340 A1 2/2021 Miller et al.
2021/0147155 A1 5/2021 Collier
2021/0222392 A1 7/2021 Miller et al.
2021/0238924 A1 8/2021 MacKarvich
2021/0238925 A1 8/2021 MacKarvich
2021/0372200 A1 12/2021 Walsh
2022/0136327 A1 5/2022 MacKarvich
2022/0227588 A1 7/2022 Collier
2023/0258042 A1 8/2023 MacKarvich

FOREIGN PATENT DOCUMENTS

EP 3859121 8/2021
FR 3029560 6/2016
FR 3054592 2/2018
WO 2005044384 5/2005

OTHER PUBLICATIONS

US 11,459,825 B2, 10/2022, MacKarvich (withdrawn)
MacKarvich, Charles J.; Final Office Action for U.S. Appl. No. 17/578,311, filed Jan. 18, 2022, mailed Nov. 10, 2022, 14 pgs.
MacKarvich, Charles J.; Applicant-Initiated Interview Summary for U.S. Appl. No. 17/672,058, filed Feb. 15, 2022, mailed Nov. 3, 2022, 3 pgs.
MacKarvich, Charles J.; Final Office Action for U.S. Appl. No. 17/672,058, filed Feb. 15, 2022, mailed Dec. 20, 2022, 27 pgs.
MacKarvich, Charles J.; Applicant-Initiated Interview Summary for U.S. Appl. No. 17/075,879, filed Oct. 21, 2020, mailed Nov. 12, 2021, 2 pgs.
MacKarvich, Charles J.; Applicant-Initiated Interview Summary for U.S. Appl. No. 17/075,879, filed Oct. 21, 2020, mailed Apr. 20, 2022, 3 pgs.
MacKarvich, Charles J.; Applicant-Initiated Interview Summary for U.S. Appl. No. 17/075,879, filed Oct. 21, 2020, mailed Jun. 10, 2021, 2 pgs.
MacKarvich, Charles J.; Final Office Action for U.S. Appl. No. 17/075,879, filed Oct. 21, 2020, mailed Jun. 24, 2021, 21 pgs.
MacKarvich, Charles J.; Non-Final Office Action for U.S. Appl. No. 17/075,879, filed Oct. 21, 2020, mailed Jan. 28, 2022, 22 pgs.
MacKarvich, Charles J.; Non-Final Office Action for U.S. Appl. No. 17/075,879, filed Oct. 21, 2020, mailed Mar. 12, 2021, 16 pgs.

(56) References Cited

OTHER PUBLICATIONS

MacKarvich, Charles J.; Notice of Allowance for U.S. Appl. No. 17/075,879, filed Oct. 21, 2020, mailed May 19, 2022, 15 pgs.
MacKarvich, Charles J.; Notice of Pre-AIA or AIA Status for U.S. Appl. No. 17/075,879, filed Oct. 21, 2020, mailed Oct. 22, 2021, 5 pgs.
MacKarvich, Charles J.; Requirement for Restriction/Election for U.S. Appl. No. 17/075,879, filed Oct. 21, 2020, mailed Jan. 4, 2021, 8 pgs.
3M; Instruction Manual for LAD-SAF Flexible Cable Vertical Safety Systems, Copyright 2019, 225 pgs.
MacKarvich, Charles J.; Applicant-Initiated Interview Summary for U.S. Appl. No. 17/075,942, filed Oct. 21, 2020, mailed Jun. 15, 2021, 2 pgs.
MacKarvich, Charles J.; Applicant-Initiated Interview Summary for U.S. Appl. No. 17/075,942, filed Oct. 21, 2020, mailed Sep. 10, 2021, 3 pgs.
MacKarvich, Charles J.; Non-Final Office Action for U.S. Appl. No. 17/075,942, filed Oct. 21, 2020, mailed Mar. 16, 2021, 14 pgs.
MacKarvich, Charles J.; Non-Final Office Action for U.S. Appl. No. 17/075,942, filed Oct. 21, 2020, mailed Jul. 19, 2021, 19 pgs.
MacKarvich, Charles J.; Notice of Allowance for U.S. Appl. No. 17/075,942, filed Oct. 21, 2020, mailed Oct. 20, 2021, 18 pgs.
MacKarvich, Charles J.; Requirement for Restriction/Election for U.S. Appl. No. 17/075,942, filed Oct. 21, 2020, mailed Jan. 12, 2021, 9 pgs.
MacKarvich, Charles J.; Supplemental Notice of Allowance for U.S. Appl. No. 17/075,942, filed Oct. 21, 2020, mailed Nov. 23, 2021, 8 pgs.
OCM; Specification Sheet for Coil Wing Nut, publicly available prior to Feb. 3, 2020, 1 pg.
MacKarvich, Charles J.; Applicant-Initiated Interview Summary for U.S. Appl. No. 17/578,311, filed Jan. 18, 2022, mailed Oct. 3, 2022, 3 pgs.
MacKarvich, Charles J.; Non-Final Office Action for U.S. Appl. No. 17/578,311, filed Jan. 18, 2022, mailed Jul. 21, 2022, 25 pgs.
MacKarvich, Charles J.; Requirement for Restriction/Election for U.S. Appl. No. 17/578,311, filed Jan. 18, 2022, mailed Feb. 24, 2022, 9 pgs.
MacKarvich, Charles J.; Non-Final Office Action for U.S. Appl. No. 17/672,058, filed Feb. 15, 2022, mailed Aug. 18, 2022, 33 pgs.
MacKarvich, Charles J.; Requirement for Restriction/Election for U.S. Appl. No. 17/672,058, filed Feb. 15, 2022, mailed May 9, 2022, 10 pgs.
MacKarvich, Charles J.; Advisory Action for U.S. Appl. No. 17/578,311, filed Jan. 18, 2022, mailed Feb. 8, 2023, 5 pgs.
MacKarvich, Charles J.; Non-Final Office Action for U.S. Appl. No. 17/578,311, filed Jan. 18, 2022, mailed Mar. 10, 2023, 19 pgs.
MacKarvich, Charles J.; Notice of Allowance for U.S. Appl. No. 17/672,058, filed Feb. 15, 2022, mailed Apr. 14, 2023, 20 pgs.
MacKarvich, Charles J.; Advisory Action for U.S. Appl. No. 17/578,311, filed Jan. 18, 2022, mailed Sep. 29, 2023, 8 pgs.
MacKarvich, Charles J.; Final Office Action for U.S. Appl. No. 17/578,311, filed Jan. 18, 2022, mailed Jun. 29, 2023, 20 pgs.
Quick Release Pins, accessed from https://monroeengineering.com/products-quick-release-pins.php, available as of Jun. 14, 2017 (Year: 2017), 3 pgs.
MacKarvich, Charles J.; Non-Final Office Action for U.S. Appl. No. 17/578,311, filed Jan. 18, 2022, mailed Nov. 15, 2023, 12 pgs.
MacKarvich, Charles J.; Applicant-Initiated Interview Summary for U.S. Appl. No. 17/578,311, filed Jan. 18, 2022, mailed Feb. 15, 2024, 2 pgs.
MacKarvich, Charles J.; Final Office Action for U.S. Appl. No. 17/578,311, filed Jan. 18, 2022, mailed Mar. 14, 2024, 11 pgs.

* cited by examiner

LADDER DOCK

REFERENCE TO RELATED APPLICATIONS

This application is a continuation of U.S. application Ser. No. 17/075,879, filed Oct. 21, 2020, which claims the benefit of U.S. Provisional Application No. 62/969,388, filed Feb. 3, 2020, and U.S. Provisional Application No. 62/968,705, filed Jan. 31, 2020, each of which is hereby specifically incorporated by reference herein in its entirety.

TECHNICAL FIELD

Field of Use

This disclosure relates to ladder stabilization systems. More specifically, this disclosure relates to ladder docks for fixing a position of a ladder, such as a portable ladder, relative to an elevated structure.

Related Art

Ladders are commonly used to reach portions of an elevated structure not otherwise accessible. Among many other uses, a ladder can allow a user to reach such an elevated structure to perform maintenance and repair or as part of a building process but are often used only temporarily—for hours or days at most in many cases—and are therefore often of the portable variety. Portable ladders—especially in an extended condition where the elevated structure is quite high off the ground—are by definition not generally fixed to either the ground or to the elevated structure. Such ladders generally depend on gravity, friction, and the care taken by the user of the ladder for their stability.

Once a ladder is used to access an elevated structure, passing through, over, or around the ladder and safely descending to a surface of the elevated structure can present its own challenges, especially when a parapet is defined at or near an edge of the elevated structure.

SUMMARY

It is to be understood that this summary is not an extensive overview of the disclosure. This summary is exemplary and not restrictive, and it is intended to neither identify key or critical elements of the disclosure nor delineate the scope thereof. The sole purpose of this summary is to explain and exemplify certain concepts of the disclosure as an introduction to the following complete and extensive detailed description.

In one aspect, disclosed is a ladder dock comprising: a planar mounting panel defining an upper surface and a lower surface, the lower surface of the mounting panel configured to contact and be secured to a surface of an elevated structure; and a planar connecting panel defining an upper surface and a lower surface, the connecting panel extending from the mounting panel and angled with respect to the mounting panel, the connecting panel angled upward with respect to the mounting panel by a bend angle, an angle between the upper surface of the mounting panel and the upper surface of the connecting panel being less than 180 degrees, the connecting panel defining a first ear and a second ear, each of the first ear and the second ear extending in a direction away from the mounting panel, each of the first ear and the second ear being coplanar with the connecting panel, the first ear and the second ear defining a ladder notch therebetween, the ladder notch sized to receive and fix a position of a ladder relative to the ladder dock, the ladder dock being formed from a single blank.

In a further aspect, disclosed is ladder dock comprising: a planar mounting panel defining an upper surface and a lower surface, the lower surface of the mounting panel configured to contact and be secured to a surface of an elevated structure; and a planar connecting panel defining an upper surface and a lower surface, the connecting panel extending from the mounting panel and angled with respect to the mounting panel, the connecting panel angled upward with respect to the mounting panel by a bend angle, an angle between the upper surface of the mounting panel and the upper surface of the connecting panel being less than 180 degrees, the connecting panel defining a first notch and a second notch, a portion of the connecting panel positioned between the first notch and the second notch, each of the first notch and the second notch extending in a direction away from the mounting panel, the first notch and the second notch sized to receive and fix a position of a ladder relative to the ladder dock by receiving a first ladder rail of the ladder in the first notch and receiving a second ladder rail of the ladder in the second notch, the ladder dock being formed from a single blank.

In yet another aspect, disclosed is a ladder dock system comprising a ladder dock comprising: a planar mounting panel defining an upper surface and a lower surface, the lower surface of the mounting panel configured to contact and be secured to a surface of an elevated structure, the mounting panel and the ladder dock terminating in a rearward direction at a rear edge of the mounting panel; and a planar connecting panel defining an upper surface and a lower surface, the connecting panel extending from the mounting panel and angled with respect to the mounting panel, the connecting panel angled upward with respect to the mounting panel by a bend angle, an angle between the upper surface of the mounting panel and the upper surface of the connecting panel being less than 180 degrees, the connecting panel defining a first ear and a second ear, each of the first ear and the second ear extending in a direction away from the mounting panel, each of the first ear and the second ear being coplanar with the connecting panel, and the first ear and the second ear defining a ladder notch therebetween; and a ladder configured to provide access to the elevated structure and sized to rest against the ladder dock, and the ladder notch sized to receive and fix a position of the ladder relative to the ladder dock.

Various implementations described in the present disclosure may comprise additional systems, methods, features, and advantages, which may not necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims. The features and advantages of such implementations may be realized and obtained by means of the systems, methods, features particularly pointed out in the appended claims. These and other features will become more fully apparent from the following description and appended claims, or may be learned by the practice of such exemplary implementations as set forth hereinafter.

BRIEF DESCRIPTION OF THE DRAWINGS

The accompanying drawings, which are incorporated in and constitute a part of this specification, illustrate several aspects of the disclosure and together with the description, serve to explain various principles of the disclosure. The drawings are not necessarily drawn to scale. Corresponding features and components throughout the figures may be designated by matching reference characters for the sake of consistency and clarity.

DETAILED DESCRIPTION

Figure 1:
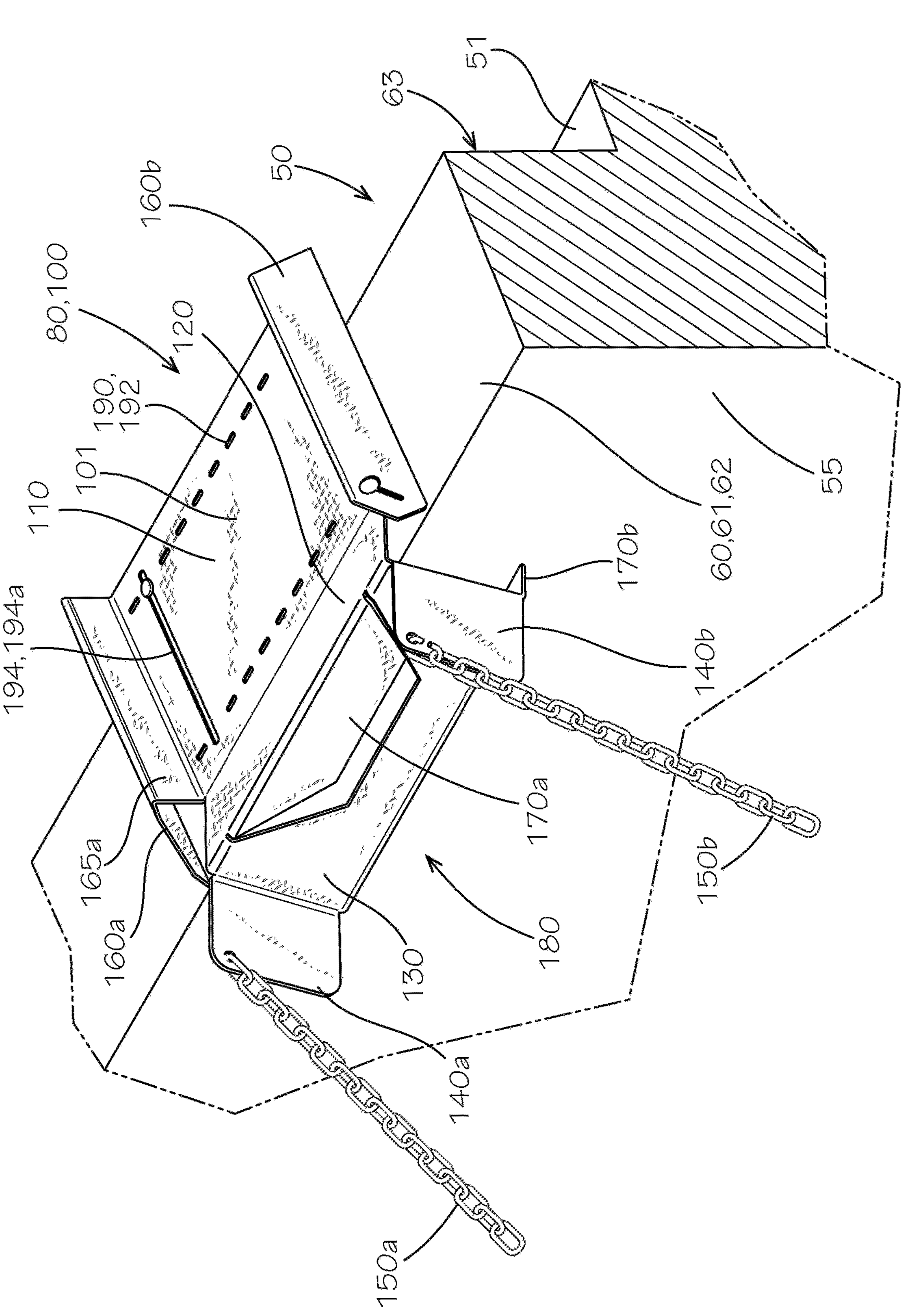
FIG. 1 is a front top perspective view of a ladder dock in an installed condition on a roof with a parapet in accordance with one aspect of the current disclosure.

The present disclosure can be understood more readily by reference to the following detailed description, examples, drawings, and claims, and their previous and following description. However, before the present devices, systems, and/or methods are disclosed and described, it is to be understood that this disclosure is not limited to the specific devices, systems, and/or methods disclosed unless otherwise specified, as such can, of course, vary. It is also to be understood that the terminology used herein is for the purpose of describing particular aspects only and is not intended to be limiting.

The following description is provided as an enabling teaching of the present devices, systems, and/or methods in their best, currently known aspect. To this end, those skilled in the relevant art will recognize and appreciate that many changes can be made to the various aspects described herein, while still obtaining the beneficial results of the present disclosure. It will also be apparent that some of the desired benefits of the present disclosure can be obtained by selecting some of the features of the present disclosure without utilizing other features. Accordingly, those who work in the art will recognize that many modifications and adaptations to the present disclosure are possible and can even be desirable in certain circumstances and are a part of the present disclosure. Thus, the following description is provided as illustrative of the principles of the present disclosure and not in limitation thereof.

As used throughout, the singular forms "a," "an" and "the" include plural referents unless the context clearly dictates otherwise. Thus, for example, reference to a quantity of one of a particular element can comprise two or more such elements unless the context indicates otherwise. In addition, any of the elements described herein can be a first such element, a second such element, and so forth (e.g., a first widget and a second widget, even if only a "widget" is referenced).

Ranges can be expressed herein as from "about" one particular value, and/or to "about" another particular value. When such a range is expressed, another aspect comprises from the one particular value and/or to the other particular value. Similarly, when values are expressed as approximations, by use of the antecedent "about" or "substantially," it will be understood that the particular value forms another aspect. It will be further understood that the endpoints of each of the ranges are significant both in relation to the other endpoint, and independently of the other endpoint.

For purposes of the current disclosure, a material property or dimension measuring about X or substantially X on a particular measurement scale measures within a range between X plus an industry-standard upper tolerance for the specified measurement and X minus an industry-standard lower tolerance for the specified measurement. Because tolerances can vary between different materials, processes and between different models, the tolerance for a particular measurement of a particular component can fall within a range of tolerances.

As used herein, the terms "optional" or "optionally" mean that the subsequently described event or circumstance may or may not occur, and that the description comprises instances where said event or circumstance occurs and instances where it does not.

The word "or" as used herein means any one member of a particular list and also comprises any combination of members of that list. The phrase "at least one of A and B" as used herein means "only A, only B, or both A and B"; while the phrase "one of A and B" means "A or B."

To simplify the description of various elements disclosed herein, the conventions of "left," "right," "front," "rear," "top," "bottom," "upper," "lower," "inside," "outside,"

"inboard," "outboard," "horizontal," and/or "vertical" may be referenced. Unless stated otherwise, "front" describes that end of the system and ladder nearest to and occupied by a user of the system when the user is climbing up the ladder; "rear" is that end of the system and ladder that is opposite or distal the front; "left" is that which is to the left of or facing left from the user climbing up the ladder and facing towards the front; and "right" is that which is to the right of or facing right from the same user climbing up the ladder and facing towards the front. "Horizontal" or "horizontal orientation" describes that which is in a plane extending from left to right and aligned with the horizon. "Vertical" or "vertical orientation" describes that which is in a plane that is angled at 90 degrees to the horizontal.

In one aspect, a ladder dock and associated methods, systems, devices, and various apparatuses are disclosed herein. In one aspect, the ladder dock can comprise a mounting panel and can define a ladder notch.

FIG. 1 is a front top perspective view of a ladder dock 100 in an installed condition, position, or configuration on an elevated structure 50 in accordance with one aspect of the current disclosure. The elevated structure 50, which can be a roof of a structure such as a building, can define a surface 51, which can be a roof surface but can in other aspects be another surface. In some aspects, the surface 51 can be a horizontal surface. In some aspects, the surface 51 can be sloped with respect to the horizontal. The elevated structure 50 can define a vertical surface 55.

The elevated structure 50 can define a raised edge 60. In some aspects, as shown, the raised edge 60 can comprise a parapet or wall 62 extending from the surface 51. For example and without limitation, the wall 62 can measure a wall height 410 (shown in FIG. 4) of at least 30 inches (762 millimeters) to 42 inches (1067 millimeters) and can measure as much as 48 inches (1219 millimeters) or more. The raised edge 60 can define a top surface 61 and, at least in the case of the wall 62, a side surface 63. In some aspects, the top surface 61 can be a horizontal surface. In some aspects, the top surface 61 can be sloped with respect to the horizontal.

The ladder dock 100 can comprise a mounting panel 110, which can be positioned in facing contact with and mounted to the surface 51 and, in some aspects, the top surface 61 of the raised edge 60. The ladder dock 100 and, more specifically, the mounting panel 110 can define one or more openings such as, for example and without limitation, the mounting openings 192,194 to facilitate attachment of the ladder dock 100 to the elevated structure 50 using fasteners described below and, optionally where desired, to a bracket 95 (shown in FIG. 2), also described below. As shown, the mounting panel 110 can define a planar or flat shape and can define an upper or outside surface 101 and a lower or inner surface 102 (shown in FIG. 2).

The ladder dock 100 can comprise a ladder rest panel 130, which can be connected, directly or indirectly, to the mounting panel 110. The ladder rest panel 130 can be angled with respect to the mounting panel 110. One or more ears 140*a,b* can extend from or be formed in the ladder rest panel 130. The ears 140*a,b* can extend at an angle from the ladder rest panel 130. Together with the ladder rest panel 130, the ears 140*a,b* can define a ladder notch 180, by which the ladder dock 100 can be configured to prevent lateral movement, i.e., left-right or sideways movement, of a ladder 700 (shown in FIG. 7) positioned against the ladder rest panel 130. In some aspects, as described with respect to FIGS. 16 and 17, the ladder dock 100 can define the ladder notch 180 without the ladder rest panel 130 or, in some aspects, without even the ears 140*a,b*.

A ladder dock system 80 can comprise the ladder dock 100 and can further comprise retaining fasteners 150*a,b*, which can be secured to and extend from the ladder dock 100. More specifically, the retaining fasteners 150*a,b* can be secured to and extend from any of the mounting panel 110, a connecting panel 120, the ladder rest panel 130, or the ears 140*a, b*.

In some aspects, the ladder rest panel 130 can be connected directly to and extend from the mounting panel 110. In other aspects, the ladder rest panel 130 can be connected to and extend from the mounting panel 110 through the connecting panel 120, which as is described below can provide relief for at least a portion of the raised edge 60. In some aspects, further panels such as a pair of auxiliary panels 160*a,b* can be connected directly to and extend directly from the mounting panel 110. In other aspects, the pair of auxiliary panels 160*a,b* can be connected to and extend from the mounting panel 110 through connecting panels 165*a,b* (165*b* shown in FIG. 2).

Stop panels 170*a,b* can extend from any of the aforementioned panels to help, for example, maintain a proper orientation of the ladder dock 100 with respect to the elevated structure 50. In some aspects, as shown, the stop panel 170*a* can extend from the connecting panel 120 or from the ladder rest panel 130—depending on the precise point or location of bending of the stop panel 170*a*—and the stop panel 170*b* can extend from the ladder rest panel 130.

The ladder dock 100 can be secured to the elevated structure 50 using fasteners (not shown) extending through openings 190 defined in the mounting panel 110. More specifically, the ladder dock 100 and the mounting panel 110 can define surface mounting openings 192 and bracket mounting openings 194. In some aspects, a single opening 190 or one each of the mounting openings 192,194 can suffice. In other aspects, the ladder dock 100 and the mounting panel 110*a* can define a plurality of either the surface mounting openings 192 or the bracket mounting openings 194 or a plurality of each of the mounting openings 192,194. Defining the plurality of the surface mounting openings 192 in the ladder dock 100 and orienting a lengthwise dimension of the surface mounting openings 192 as shown can facilitate alignment of any front-and-rear set of surface mounting openings 192 with a structural member 1650 (shown in FIG. 18) positioned behind or under the surface 51 of the elevated structure 50 and generally not adjustable at all. As shown, the mounting openings 194 can more specifically be mounting openings 194*a,b* (194*b* shown in FIG. 2).

Figure 2:
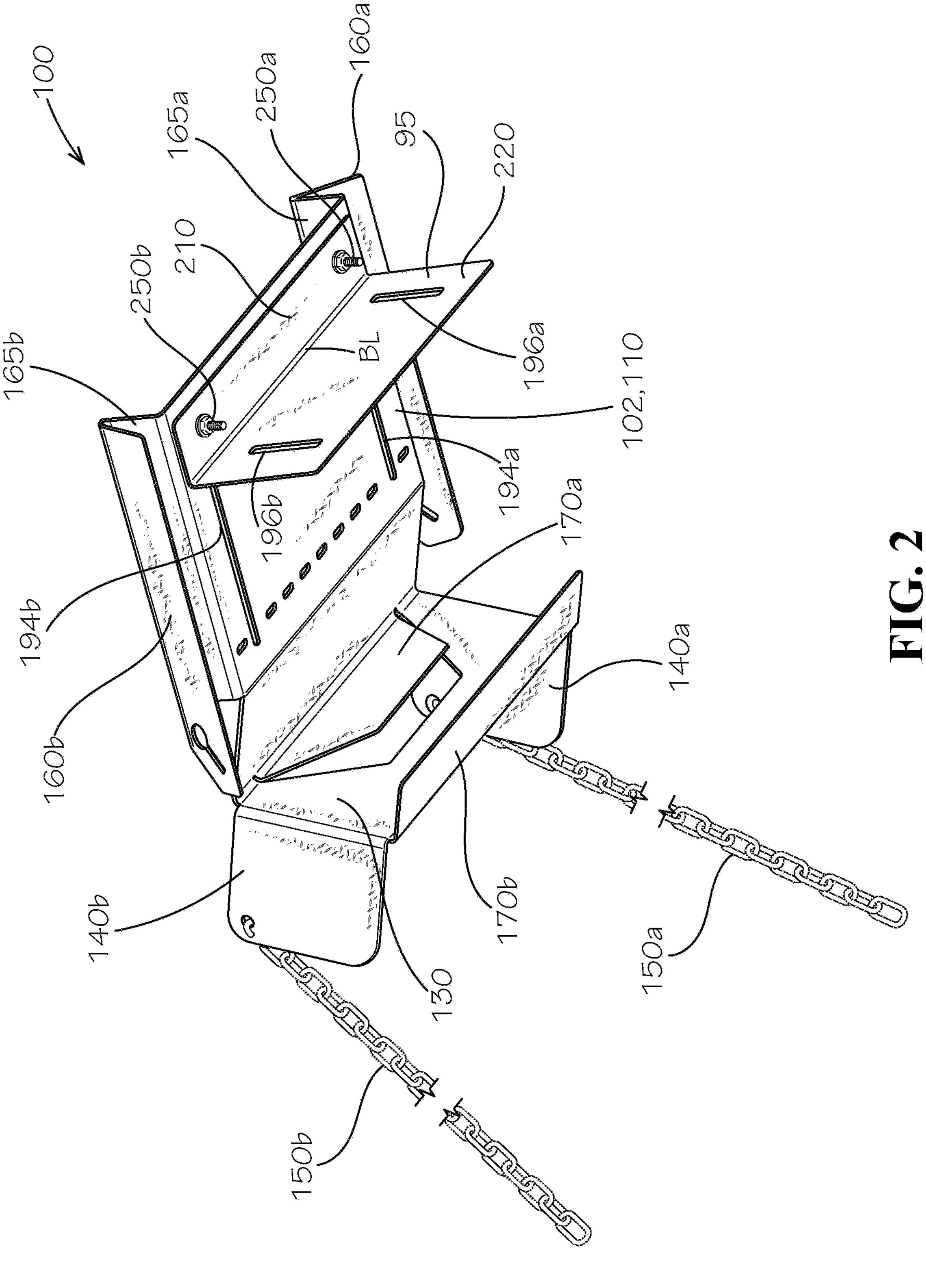
FIG. 2 is a rear bottom perspective view of the ladder dock of FIG. 1.

FIG. 2 is a rear bottom perspective view of the ladder dock 100. Fasteners 250*a,b*, which can extend through the bracket mounting openings 194*a,b* as shown, can be used to secure the bracket 95 to the mounting panel 110. As shown, the bracket 95 can be slideably coupled to the ladder dock 100 and, more specifically, the mounting panel 110 thereof. For example and without limitation, a position of the bracket 95—and thereby a distance between the bracket 95 and the stop panel 170*a* and/or the stop panel 170*b* can be positioned to match a width 420 (shown in FIG. 3) of the wall 62 (shown in FIG. 1). The bracket 95 itself can define a mounting flange or first flange 210 and a clamping flange or second flange 220. As shown, the second flange 220 can be joined to and extend from the first flange 210 at a bend line BL and can be angled with respect to the first flange 210. More specifically, the second flange 220 can be angled with respect to the first flange 210 by an angle of about 90 degrees. In some aspects, the bracket 95 can define mounting openings such as mounting openings 196*a,b* for further securing the bracket 95 and the ladder dock 100 to the wall 62. The bracket 95 can be secured in position with the fasteners extending through the first flange 210 or through friction between the bracket 95 and the side surface 63 (shown in FIG. 1), which can result from a clamping force created by the ladder dock 100 and specifically the bracket 95 when secured to the ladder dock 100.

Figure 3:
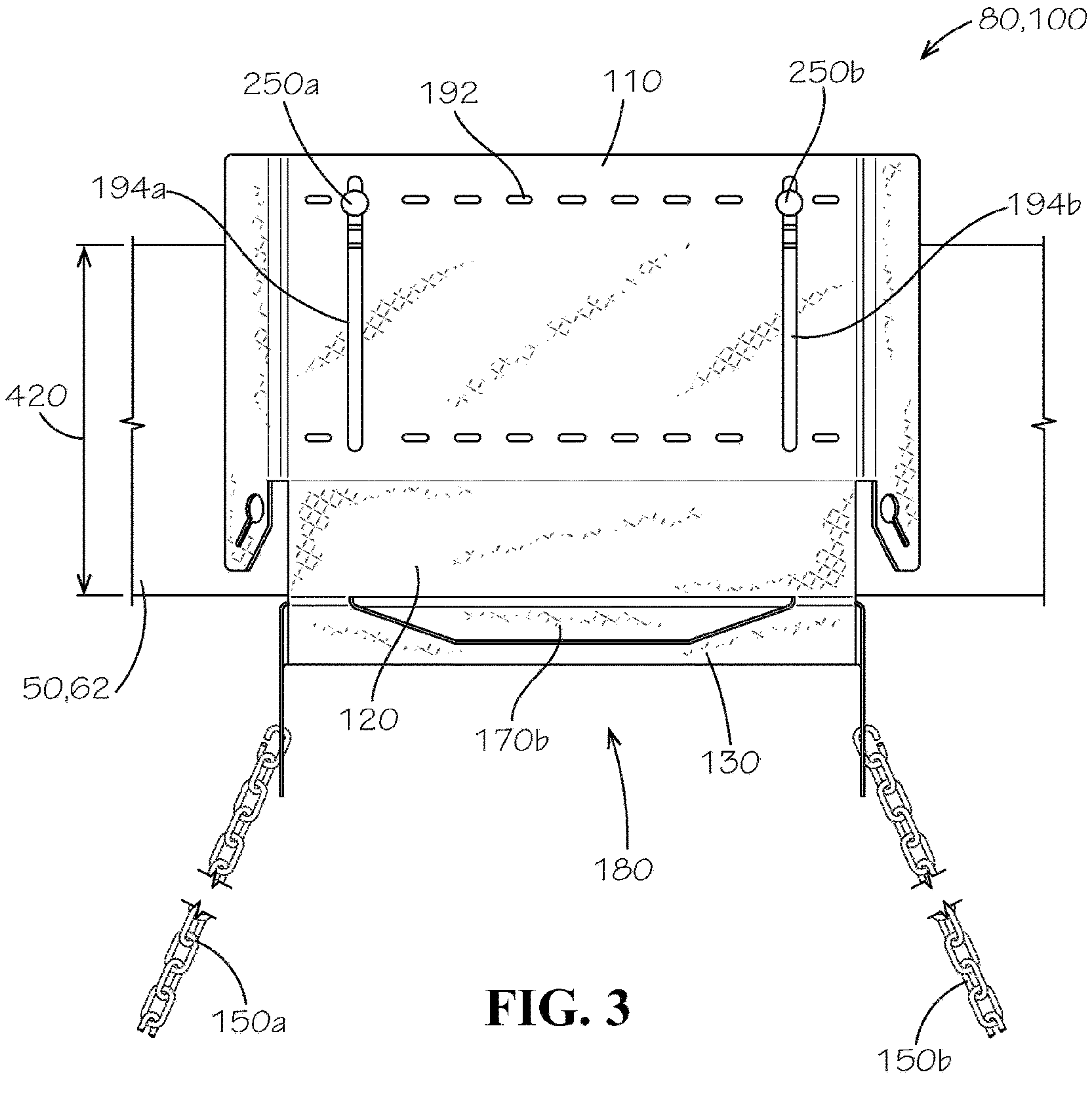
FIG. 3 is a top plan view of the ladder dock of FIG. 1.

FIG. 3 is a top plan view of the ladder dock 100. In some aspects, as shown, a long dimension or length of the bracket mounting openings 194*a,b* can be orthogonal to a lengthwise direction of the wall 62, which can facilitate adjustment of a position of the bracket 95 (shown in FIG. 2) with respect to the wall 62 of the elevated structure 50. In other aspects, portions of the bracket mounting openings 194*a,b* can be angled at an angle other than 90 degrees with respect to the lengthwise direction of the wall 62 or can be parallel to the lengthwise direction of the wall 62 such as, for example and without limitation, at positions corresponding to common sizes of the width 420 of the wall 62.

In some aspects, as shown, a long dimension or length of the surface mounting openings 192 can be parallel to a lengthwise direction of the wall 62, which can facilitate adjustment of a position of the ladder dock 100 with respect to the elevated structure 50. In other aspects, portions of the surface mounting openings 192 can be angled with respect to the lengthwise direction of the wall 62 or can be orthogonal to the lengthwise direction of the wall 62. In some aspects, the mounting openings 192,194,196 (mounting openings 196 shown in FIG. 2) can be other than slotted openings and can be circular or non-circular in shape. As shown, the fasteners 250*a,b* can comprise a bolt and a nut. A portion—such as the nut or the bolt of each—of the fasteners 250*a,b* can be permanently secured to the bracket 95 or the mounting panel 110, respectively. In some aspects, the fasteners 250*a,b* can be configured for tightening with a tool (such as a hex wrench or a combination of a hex socket and a ratchet). In some aspects, the fasteners 250*a,b* can be configured for tightening without a tool by the use of hand-tightenable fasteners such as, for example and without limitation, wing nuts or cam-and-lever fasteners.

Figure 4:
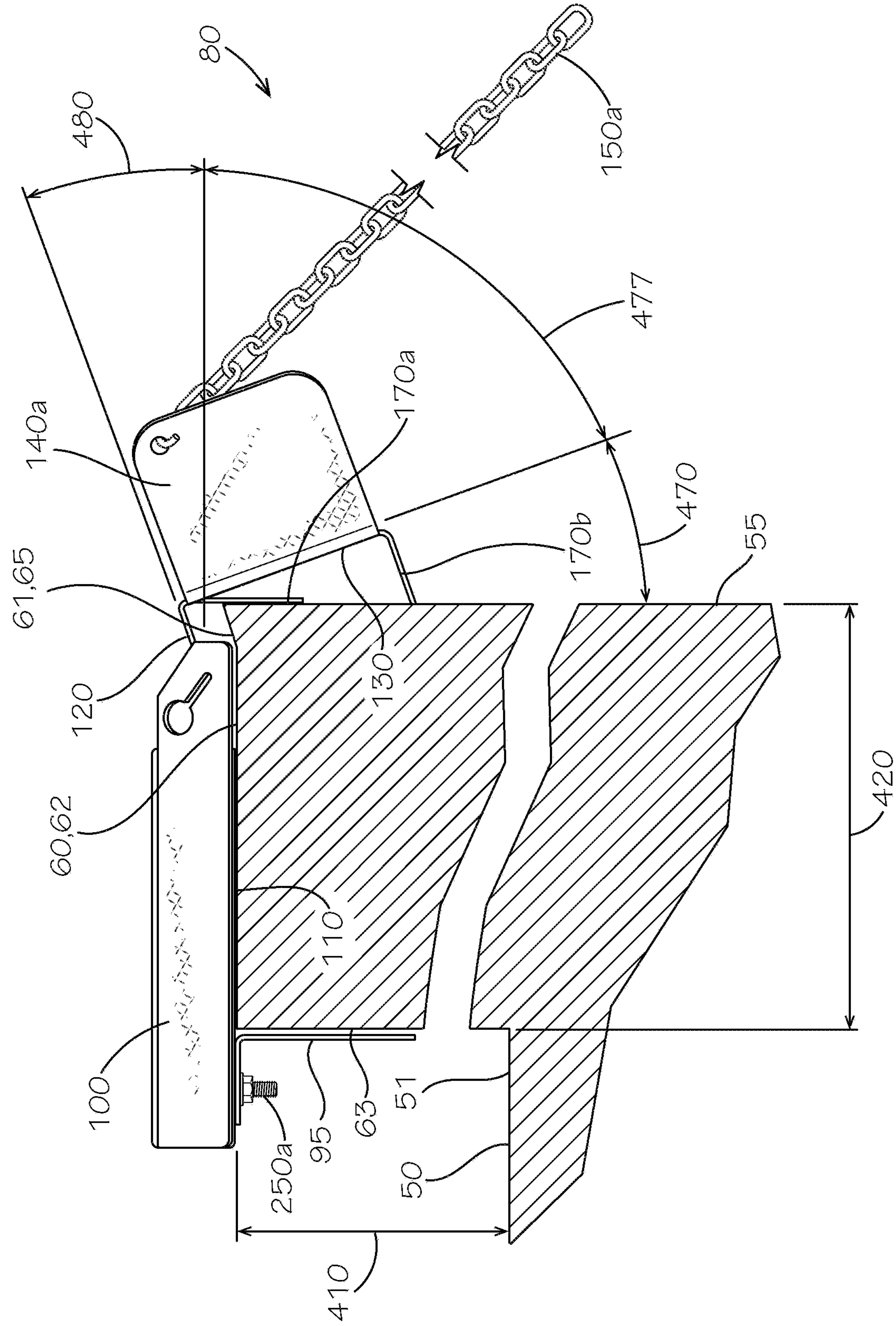
FIG. 4 is a side view of the ladder dock of FIG. 1 in the installed condition in accordance with another aspect of the current disclosure.

FIG. 4 is a side view of the ladder dock 100 in the installed condition in accordance with another aspect of the current disclosure. As shown, the raised edge 60 of the elevated structure 50 can comprise both the wall 62 and a flange or lip 65. As shown, all or part of the stop panel 170*a* can be in contact with and prevent movement—including but not limited to translation—of the ladder dock 100 past the vertical surface 55 of the elevated structure 50. As shown, all or part of the stop panel 170*b* can be in contact with and prevent movement—including but not limited to rotation—of the ladder dock 100 past the vertical surface 55 of the elevated structure 50. The connecting panel 120 can be bent with respect to the mounting panel 110 by a bend angle 480, which can provide clearance for the lip 65 and, with such clearance, enable the mounting panel 110 to lay flat against the top surface 61 of the wall 62. More specifically, the connecting panel 120 can define a clearance gap sized large enough to receive without interference the lip 65. Again, the wall 62 itself can define the wall height 410 and the width 420.

To secure the mounting panel 110 to the elevated structure and, more specifically, the wall 62 the aforementioned fasteners can be installed through the openings 190 (shown in FIG. 1) and, more specifically, the surface mounting openings 192 (shown in FIG. 1). In some aspects, a silicone or other caulk or adhesive can be used between the mounting panel 110 and the top surface 61 of the wall 62. In some aspects, an anti-skid material (not shown) can be used on a mating surface of the ladder dock 100 to further restrict movement of the ladder 700 with respect to the ladder dock 100.

Per regulatory requirements such as those issued by the Occupational Safety & Health Administration (OSHA), a minimum ladder angle on a portable ladder such as the ladder 700 (shown in FIG. 7) leaned up against a building comprising the elevated structure 50 can be, when rounded to the nearest half degree, 14.5 degrees from the vertical or 75.5 degrees from the horizontal. This particular minimum ladder angle corresponds to a horizontal ladder "run" from the point of support on the elevated structure 50 to a point of ladder contact with the ground measuring one quarter of the vertical ladder "rise" between the same two points. Accordingly, a ladder rest angle 470 can measure, for example and without limitation, at least about 14.5 degrees or any other desired angle to provide a quick visual check of the ladder angle for any user of the ladder dock system 80, and a corresponding or complementary angle 477 measured from the horizontal can measure less than about 75.5 degrees or any other desired angle. As shown, the ladder rest angle 470 can be measured between a surface of the ladder rest panel 130 and the vertical orientation, and the complementary angle 477 can be measured between the same surface of the ladder rest panel 130 and the horizontal.

Figure 5:
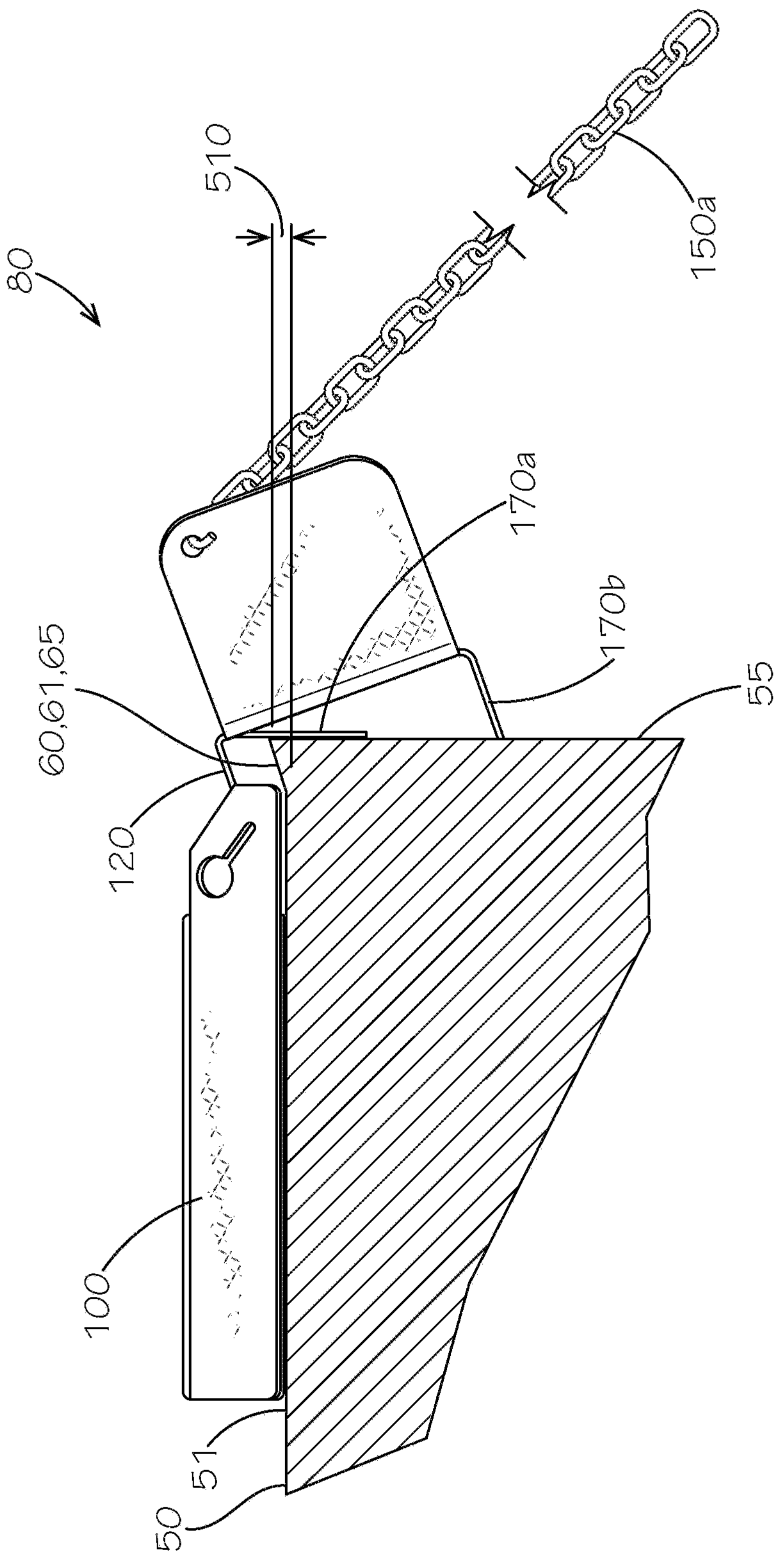
FIG. 5 is a side view of the ladder dock of FIG. 1 in the installed condition on a flat roof in accordance with another aspect of the current disclosure.

FIG. 5 is a side view of the ladder dock 100 in the installed condition in accordance with another aspect of the current disclosure. As shown, the elevated structure 50 can comprise a flat roof. In some aspects, the lip 65 of the elevated structure 50 can extend from and be offset vertically the surface 51 of the elevated structure 50 or, as described above, from the top surface 61 of the raised edge 60. For example and without limitation, the lip 65 can measure a lip height 510 of as little as a fraction of an inch (several millimeters) or more.

Figure 6:
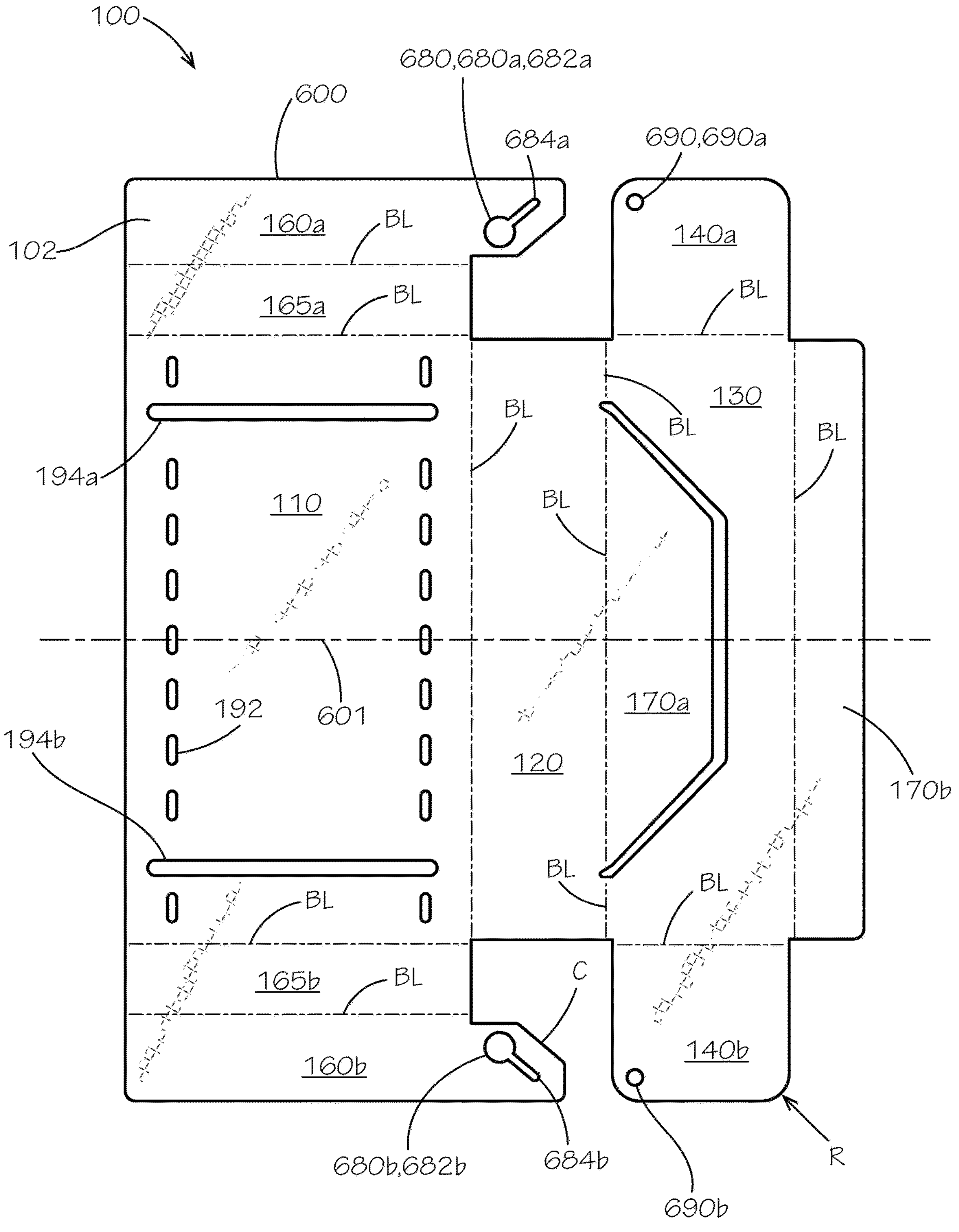
FIG. 6 is a bottom plan view of a blank from which the ladder dock of FIG. 1 can be formed. A shape of the blank shown in the bottom plan view can be identical to a shape of the blank visible in a top plan view.

FIG. 6 is a top plan view of a blank 600 from which the ladder dock 100 can be formed. In some aspects, as shown, the blank 600, the ladder dock 100, and individual portions of each can be symmetric about a line of symmetry 601. In some aspects, the blank 600, the ladder dock 100, and individual portions of each can be non-symmetric in at least one direction. As shown, intersecting panels such as the mounting panel 110, the connecting panel 120, the ladder rest panel 130, the ears 140*a,b*, the auxiliary panels 160*a,b*, and the connecting panels 165*a,b* can connect at and thereby define one or more bend lines BL. Again, the bracket 95 (shown in FIG. 2) can also define one or more bend lines BL and can be L-shaped. At each of the bend lines BL, intersecting panels can as a basic matter be bent at any angle in a positive or negative direction between 0 and 180 degrees.

As shown, all of the portions of the ladder dock 100 shown in FIG. 6 can be formed monolithically, i.e., as a single piece, from the blank 600. Also, as shown, the dimensions of various panels can be set to minimize material waste and maximize sheet utilization, especially where a sheet material such as sheet metal is used. For example and without limitation, the stop panel 170*a* can be formed from material that would otherwise be used for the ladder rest panel 130, and the material used to form the ears 140*a,b* can extend the same distance from the ladder rest panel 130 as the distance that the respective auxiliary panel 160*a,b* and connecting panel 165*a,b* extends from the mounting panel 110. As shown, intersections of various edges of the blank 600 can define chamfers C or radii R. Intersections of various edges that otherwise appear to intersect at 90-degree angles can define such angles.

The ears 140*a,b* can define one or more attachment openings 690 and, more specifically, attachment openings 690*a,b* for securing a first end of the retaining fasteners 150*a,b* (shown in FIG. 1). The ladder dock 100 can define one or more retaining openings 680 for securing a second end of the retaining fasteners 150*a,b*. For example and without limitation, the auxiliary panels 160*a,b* can define respective retaining openings 680*a,b* as shown. In some aspects, the retaining openings 680*a,b* can define a keyhole shape comprising a larger portion 682*a,b* and a smaller portion 684*a,b*. The larger portion 682*a,b* can receive a portion of the retaining fastener 150*a,b* through the retaining opening 680*a,b* and the smaller portion 684*a,b* can be smaller than the larger portion 682*a,b* and can lockably catch or retain the retaining fastener 150*a,b*.

Figure 7:
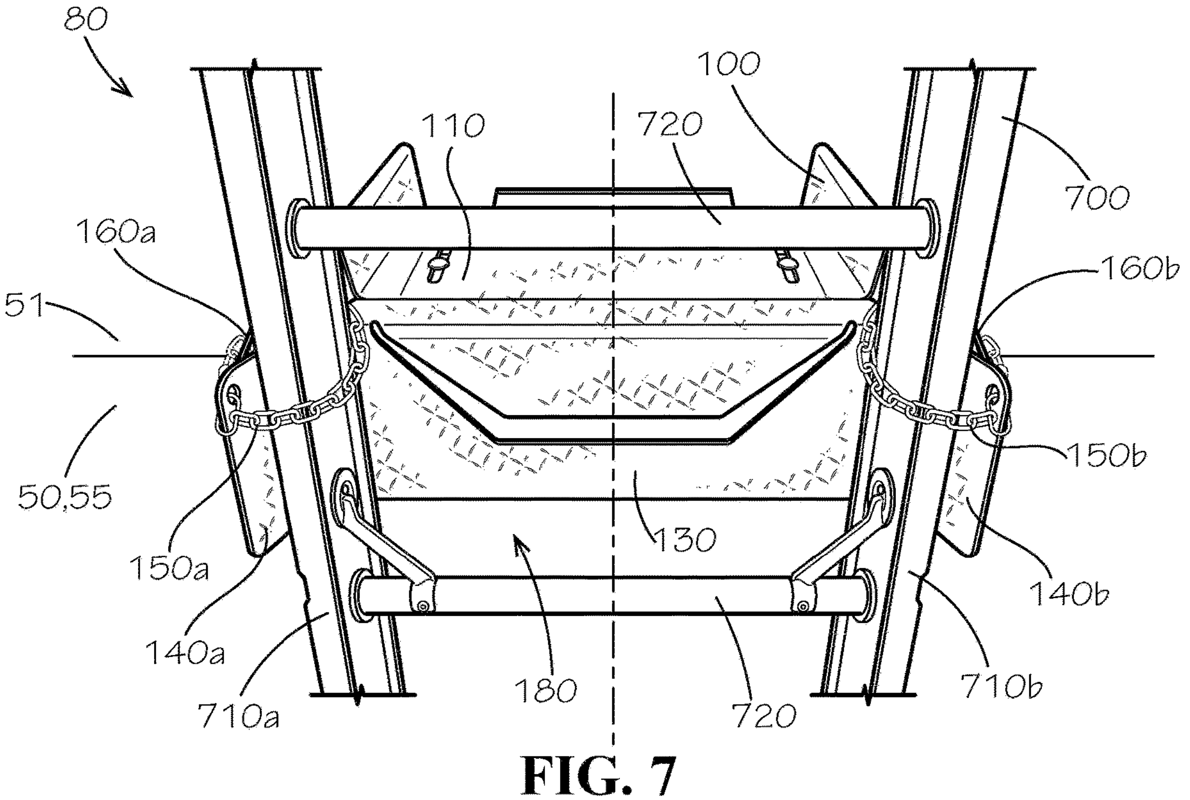
FIG. 7 is a front perspective view of a ladder dock system comprising a ladder leaning against the ladder dock of FIG. 1 and comprising two chains for securing the ladder to the ladder dock.
Figure 8:
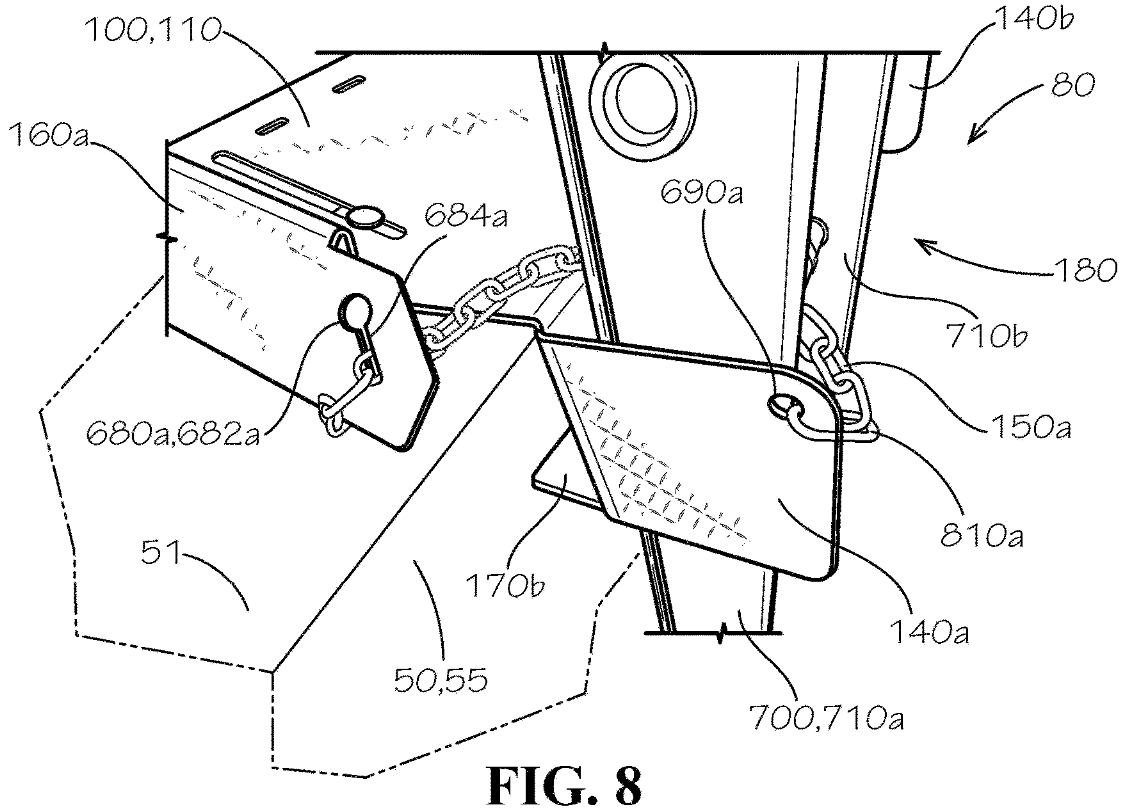
FIG. 8 is a detail side perspective view of the ladder dock system of FIG. 7

FIG. 7 is a front perspective view and FIG. 8 is a detail side perspective view of the ladder dock system 80, which can comprise the ladder 700 leaning against the ladder dock 100 and received within the ladder notch 180. As shown, the ladder 700 itself can comprise a first rail 710*a*, a second rail 710*b* offset from the first rail 710*a*, and a plurality of ladder rungs 720 extending from the first rail 710*a* to the second rail 710*b*. The ladder dock system 80 can further comprise the retaining fasteners 150*a,b* for securing the ladder 700 to the ladder dock 100. More specifically, the retaining fasteners 150*a,b* can extend from a first portion of the ladder dock 100 such as, for example and without limitation, the respective ears 140*a,b*; around the respective rails 710*a,b*; and to a second portion of the ladder dock 100 such as, for example and without limitation, the respective auxiliary panels 160*a, b*.

In some aspects, as shown in FIG. 8, the retaining fasteners 150*a,b* (150*b* shown in FIG. 7) can be secured to the ladder dock 100 and, more specifically, to each of the ears 140*a,b* and similarly to the auxiliary panels 160*a,b* (160*b* shown in FIG. 7) with a connecting fastener 810*a*. In other aspects, as shown, the retaining fasteners 150*a,b* can be secured directly to the ladder dock 100 and, more specifically, directly to the auxiliary panels 160*a,b* and similarly to each of the ears 140*a,b* with the retaining fastener 150*a,b* itself. For example and without limitation, each of the retaining fasteners 150*a,b* can be a flexible fastener such as a chain or a rope. As shown, an overall length (or an effective length between two points of attachment—for example, the retaining opening 680*a* and the connecting fastener 810*a*) of the retaining fasteners 150*a,b* can be adjustable. As shown, a portion of chain links of the retaining fastener 150*a,b* can extend through the larger portion 682*a* of the corresponding retaining opening 680*a* and can then be slid and locked into the smaller portion 684*a*. In other aspects, a rope such as a wire rope, optionally with spaced ferrules or terminating with the connecting fastener 810*a*, can secure the ladder 700 to the ladder dock 100. As shown, to facilitate retention of the ladder 700 in the ladder notch 180 of the ladder dock 100, the ears 140*a,b* can extend in a direction of extension of the ears 140*a,b* at least as far as or beyond a width of the rails 710*a,b* in the direction of extension.

Figure 9:
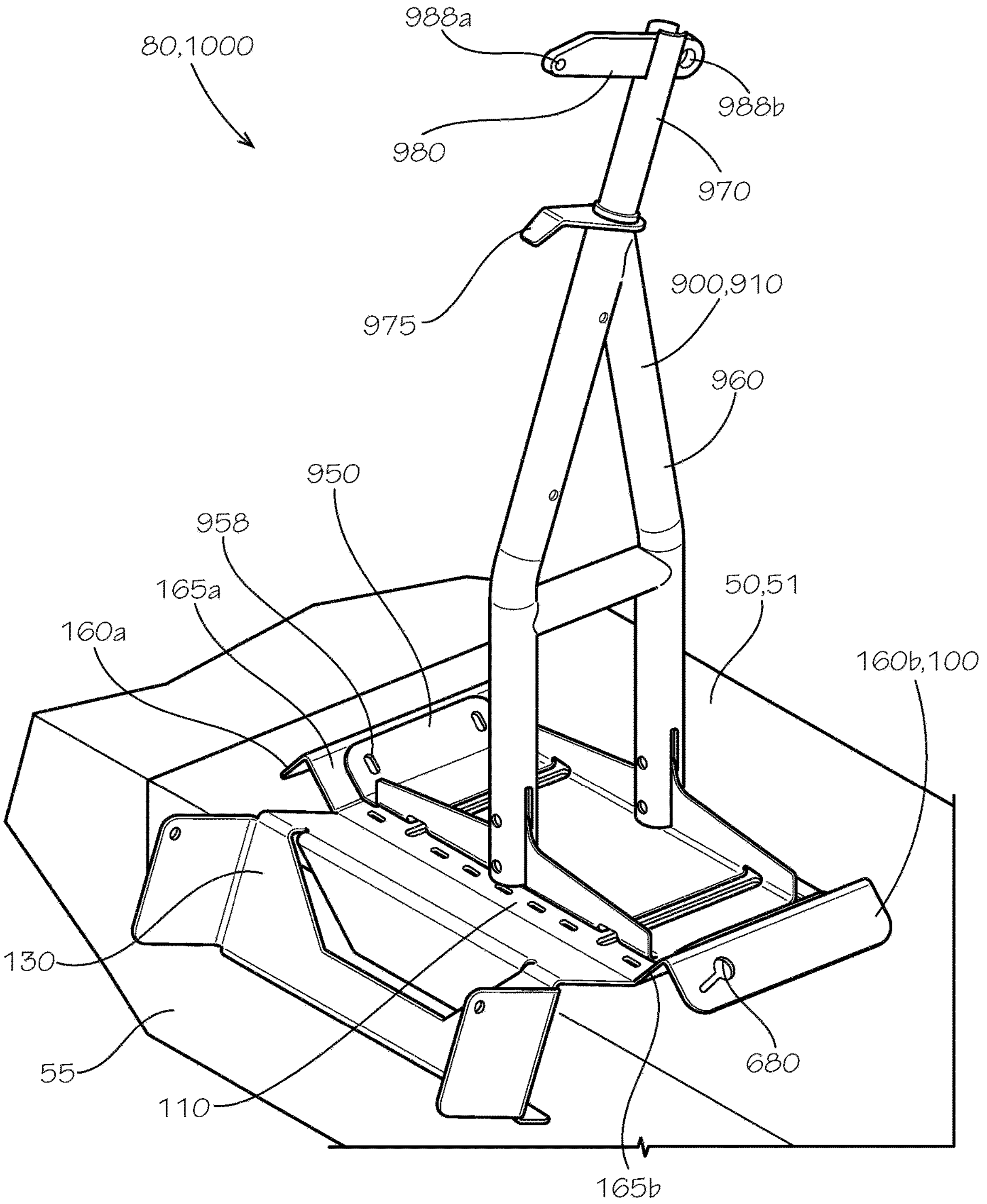
FIG. 9 is a front side perspective view of a fall arrest device of a fall arrest system shown partially assembled to the ladder dock of FIG. 1 in accordance with another aspect of the current disclosure.

FIG. 9 is a front side perspective view of a fall arrest device 900 of a fall arrest system 1000 shown partially assembled to the ladder dock 100 in accordance with another aspect of the current disclosure. The fall arrest device 900 can comprise an upper anchor 910, which can assemble to and optionally, as shown, nest within or about the ladder dock 100. In some aspects, as described above, the connecting panels 165*a,b* can be bent with respect to the mounting panel 110 at an angle of 90 degrees. In some aspects, as shown, the connecting panels 165*a,b* can be bent with respect to the mounting panel 110 at an angle of more than degrees (e.g., 135 degrees), which can facilitate installation of the upper anchor 910 even with inexact tolerances for the mating parts. Likewise, the auxiliary panels 160*a,b* can be bent with respect to the respective connecting panels 165*a,b* and with respect to the mounting panel 110 as desired to facilitate access to and use of the retaining openings 680 as well as to facilitate an interface with any neighboring portions of the ladder dock 100 or the elevated structure 50.

The upper anchor 910 can comprise a base 950 defining mounting openings 958 for securing the upper anchor 910 to the ladder dock 100. The upper anchor 910 can comprise a frame 960, which can extend from the base 950 or further define the base 950 in a vertical direction away from the surface 51 of the elevated structure 50. The frame 960, which can be formed from a plurality of separate members as shown, can comprise a ladder bracket or engagement bracket 975 for contacting and retaining a portion of the ladder 700 (shown in FIG. 7) such as one of the plurality of ladder rungs 720 (shown in FIG. 7). The upper anchor 910 can comprise a shock absorber 970, which can be configured to temporarily move when loaded by a force, such as the upper anchor 910 can experience when a user connected to the fall arrest system 1000 begins to fall and thereby engages the system. The upper anchor 910 can comprise a cable link 980, which can define an opening 988*a* for securing a cable 1090 (shown in FIG. 10) of the fall arrest system 1000 and can define an opening 988*b*.

Figure 10:
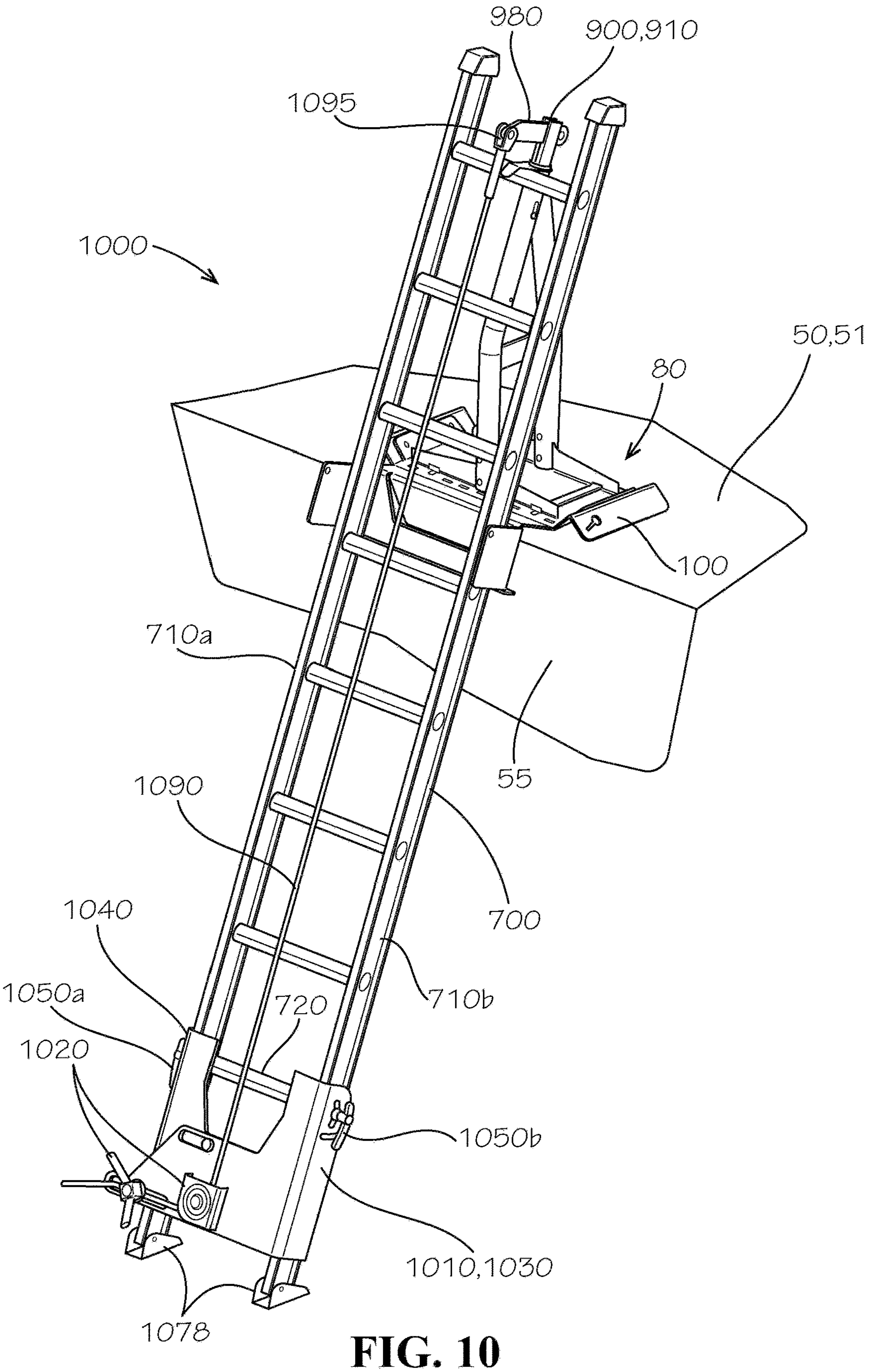
FIG. 10 is a side top perspective view of the ladder dock system of FIG. 7 further comprising a fall arrest system.

FIG. 10 is a side top perspective view of the ladder dock system 80 further comprising the fall arrest system 1000. The ladder 700 can and typically will extend above the surface 51 of the elevated structure 50 by a minimum distance. This minimum distance can be, for example and without limitation, 36 inches (approximately 914 millimeters). The fall arrest device 900 can comprise a lower anchor 1010, which can assemble to and optionally, as shown, nest within or about the ladder 700. The cable 1090 can extend from the upper anchor 910 to the lower anchor 1010. As a position of either of the lower anchor 1010 and the upper anchor 910 is adjusted, a tension in the cable 1090 can be maintained by use of a cable attachment 1020 proximate to or incorporated into the lower anchor 1010 and/or a cable attachment 1095 proximate to or incorporated into the upper anchor 910, which can be fastened to the cable link 980 with a fastener (not shown).

In some aspects, the lower anchor 1010 can comprise a first portion 1030, and the lower anchor 1010 can further comprise a second portion 1040 assembled to the first portion 1030. In other aspects, neither the first portion 1030 nor the second portion 1040 is required, and the cable 1090 can be secured to one of the ladder rungs 720 of the ladder 700 directly or through a fastener (not shown) or through the cable attachment 1020. As shown, pins 1050*a,b* can be used to secure the lower anchor 1010 to the ladder 700. More specifically, the pins 1050*a,b* can extend through portions of the lower anchor 1010 such as, respectively, the first portion 1030 and the second portion 1040 and into the nearest ladder rung 720. Each of the pins 1050*a,b* can comprise a T-handle to facilitate a manual grip by even a gloved hand. Each of the pins 1050*a,b* can comprise a magnetic surface to cause the pins 1050*a,b* to be held in position against neighboring portions of the lower anchor 1010 such as respective surfaces of the first portion 1030 and the second portion 1040. Feet 1078, which can be adjustable, can be attached to and can stabilize the rails 710*a,b* and a base of the ladder 700 and the ladder 700 generally on a lower surface 2001 (shown in FIG. 20). The feet 78 can be configured to rotate and sit flat on even uneven ground or penetrate the ground to further secure the ladder 700.

Figure 11:
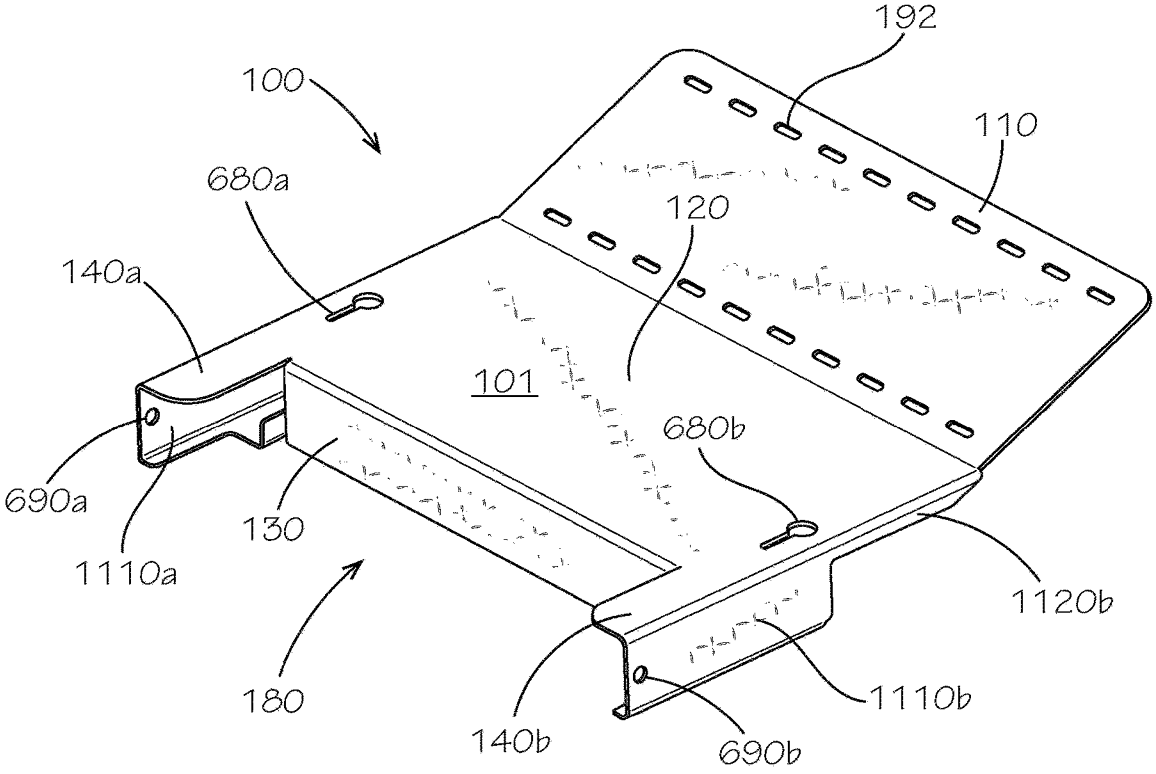
FIG. 11 is a top front perspective view of a ladder dock in accordance with another aspect of the current disclosure.
Figure 12:
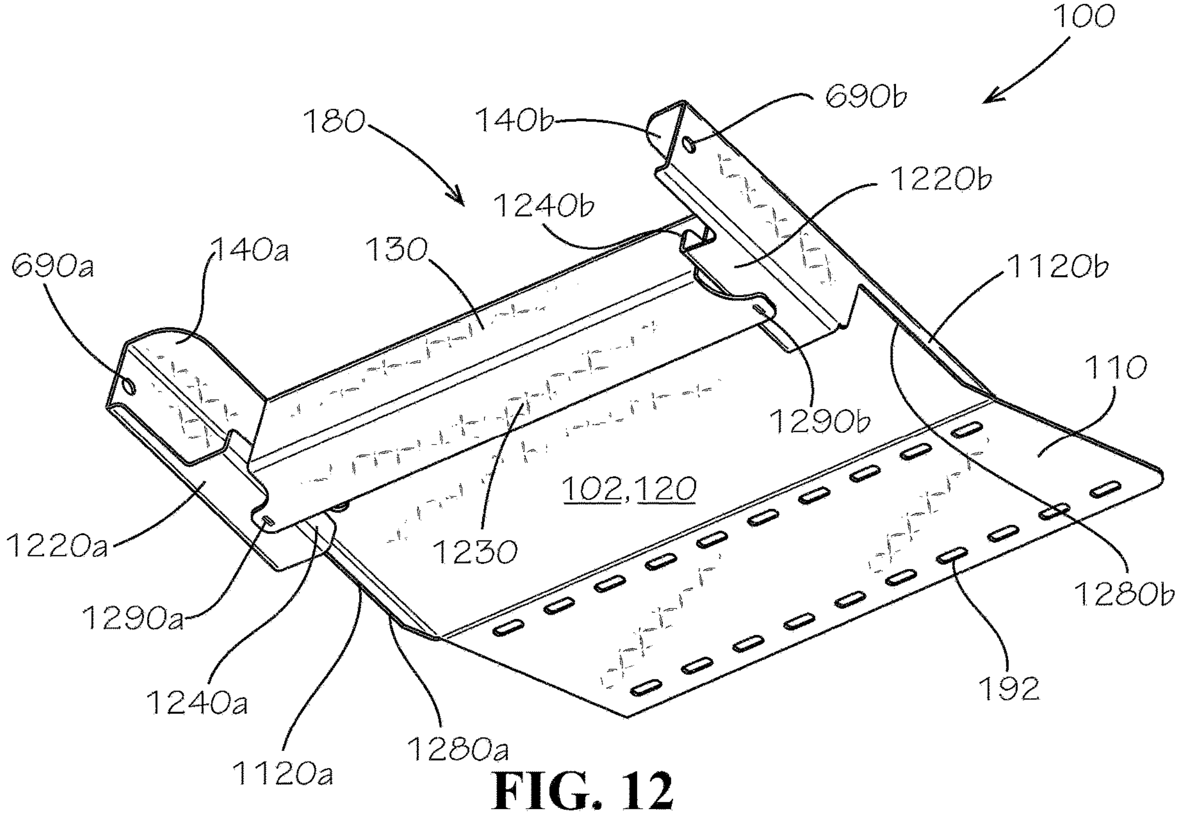
FIG. 12 is a bottom front perspective view of the ladder dock of FIG. 11.
Figure 16:
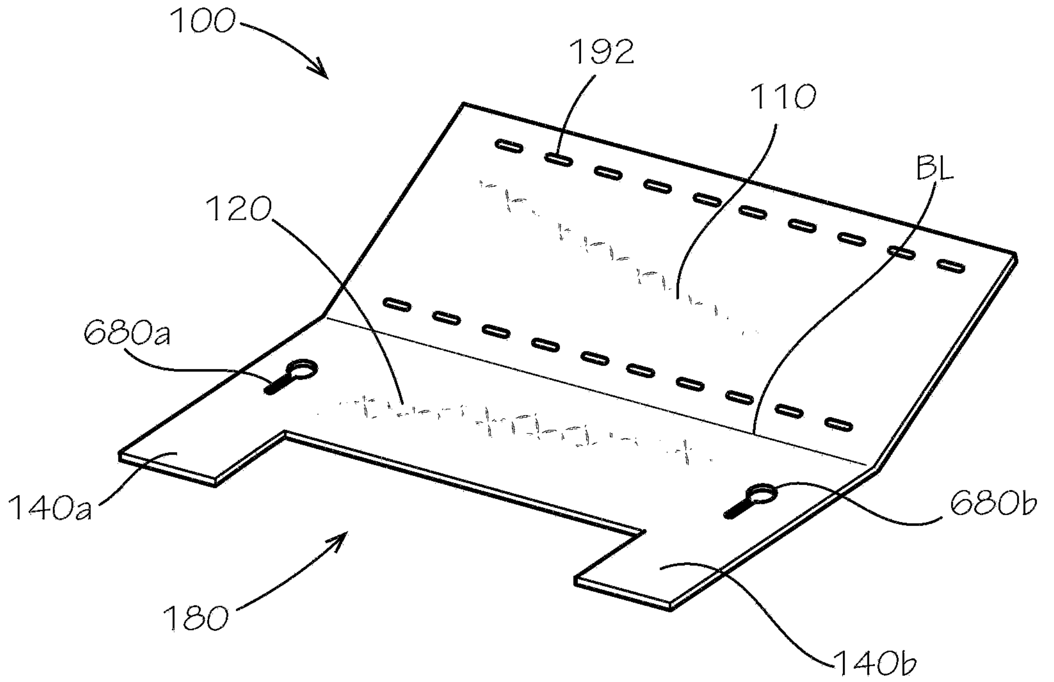
FIG. 16 is a top front perspective view of a ladder dock in accordance with another aspect of the current disclosure.
Figure 17:
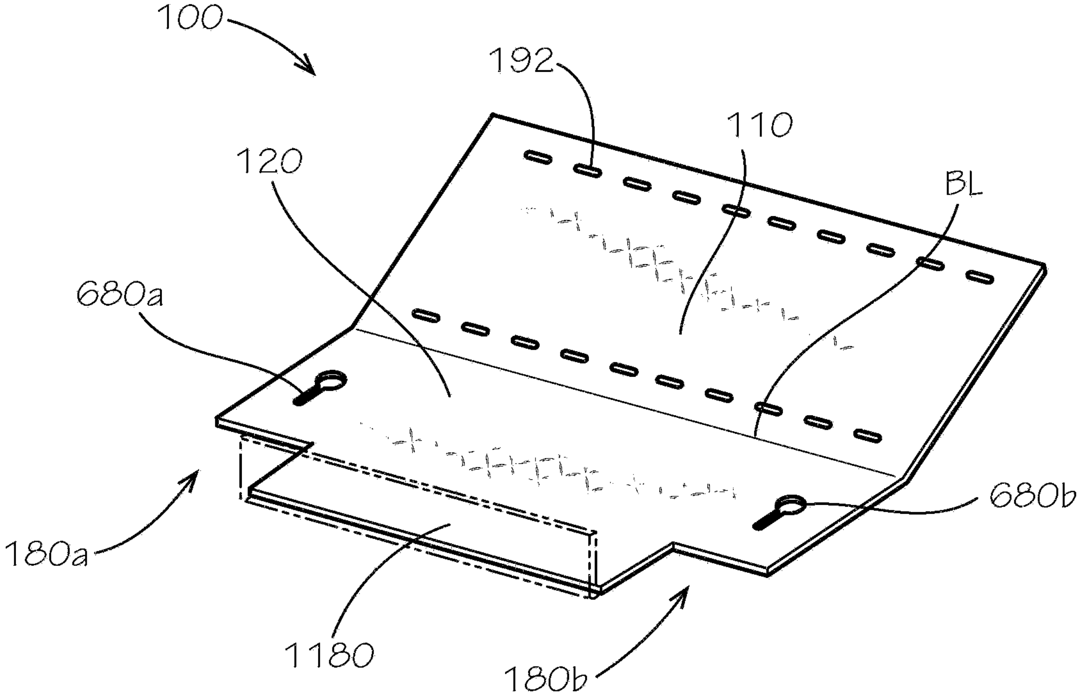
FIG. 17 is a top front perspective view of a ladder dock in accordance with another aspect of the current disclosure.
Figure 18:
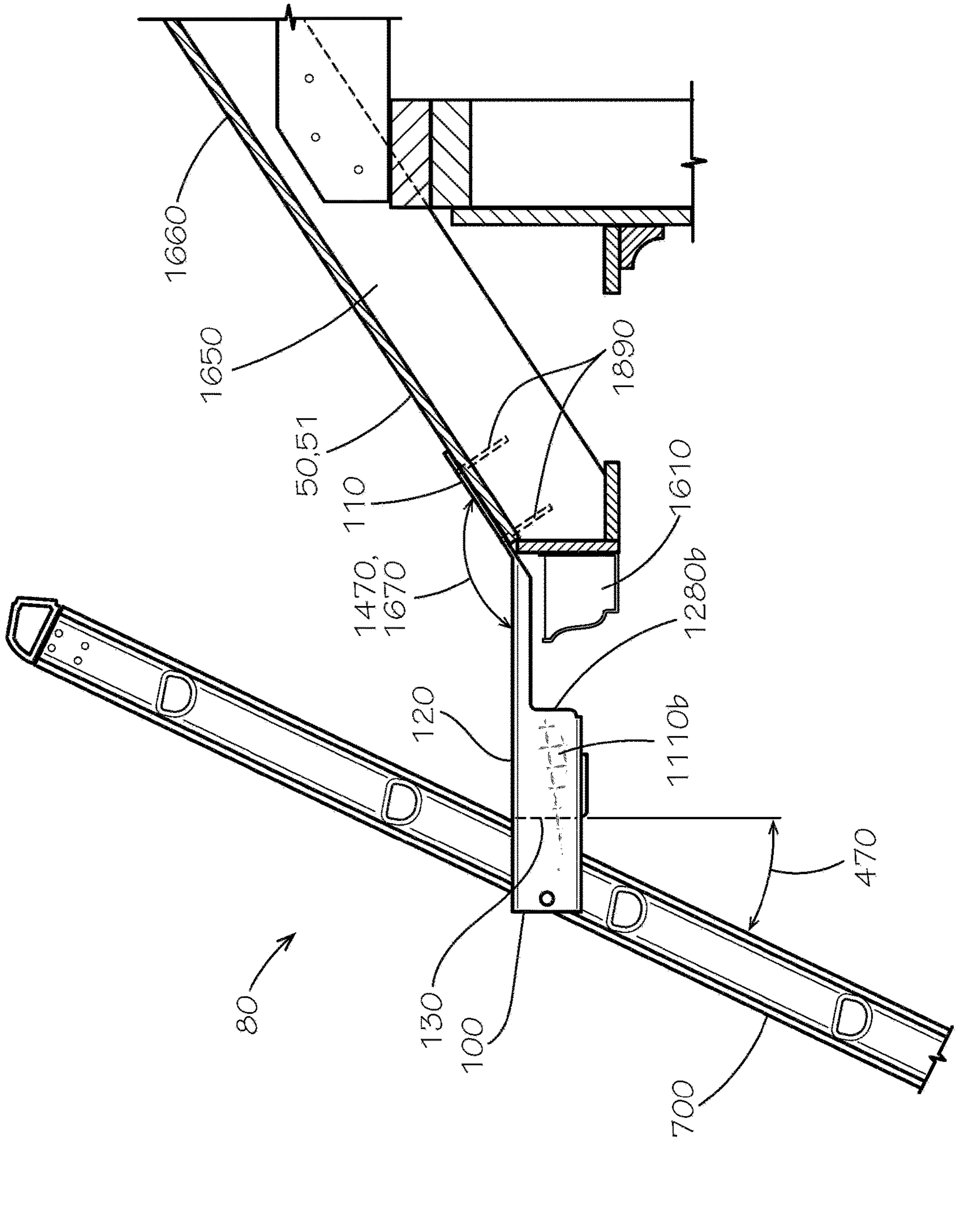
FIG. 18 is the ladder dock system of FIG. 10 in an installed condition on a sloped roof in accordance with one aspect of the current disclosure.

FIGS. 11-19 show the ladder dock 100 in accordance with another aspect of the current disclosure in which the surface 51 of the elevated structure 50 can be sloped (as exemplarily shown in FIG. 18). As shown in FIGS. 11 and 12 showing top and bottom perspective views, such a ladder dock 100 can still be formed from a single blank or otherwise formed monolithically, but the precise form can vary from that disclosed above. Referring to FIG. 11, as shown, at least a portion of the ears 140*a,b* can extend from and be coplanar with the connecting panel 120 but together with the ladder rest panel 130 still define the ladder notch 180, and the retaining openings 680*a,b* can be defined in the connecting panel 120. The ladder dock 100 can define flanges or side panels 1110*a,b*, which can be considered separate from or part of the ears 140*a,b* and can define the attachment openings 690*a,b*.

As also shown, various other flanges can extend from panels such as, for example and without limitation, the connecting panel 120 for reinforcement and improved rigidity of the ladder dock 100, especially when loads in use might otherwise cause deformation of the panels. For example and without limitation, flanges 1120*a,b* (1120*a* shown in FIG. 12) can extend from the connecting panel 120 for reinforcement of the connecting panel 120. Referring to FIG. 12, flanges 1220*a,b* can extend from the side panels 1110*a,b* (shown in FIG. 11) for reinforcement of the side panels 1110*a,b*; a strap, strap panel, or a flange 1230 can extend from the ladder rest panel 130 for reinforcement of the ladder rest panel 130; and flanges 1240*a,b* can extend from the flanges 1220*a,b* for reinforcement of the flanges 1220*a,b*. Joining adjacent or intersecting panels can also provide additional reinforcement and improved rigidity of the ladder dock 100. For example and without limitation, the flanges 1220*a,b* can be joined to the flange 1230 with respective fasteners (not shown) at fastening locations 1290*a,b*, which can be any separate fastener including rivets or screws or a fastener using the material of the joined panels themselves such as with crimping or welding of the joined panels. Various panels, including any of the aforementioned panels, can define openings such as notches for clearance of the ladder 700 (shown in FIG. 7) or the retaining fasteners 150*a,b* (shown in in FIG. 7) or for another reason such as, for example and without limitation, weight savings of the ladder dock 100. The ladder dock 100 and, more specifically, the side panels 1110*a,b* can define clearance notches 1280*a, b*. Various panels can define chamfers or external or internal radii such as radii R1 (shown in FIG. 13) and R2 (shown in FIG. 14) to, for example and without limitation, facilitate safety, ease insertion of the ladder 700 into the ladder dock 100, and/or reduce stress concentrations in, reinforce a portion of, or reduce weight of the ladder dock 100.

Figure 13:
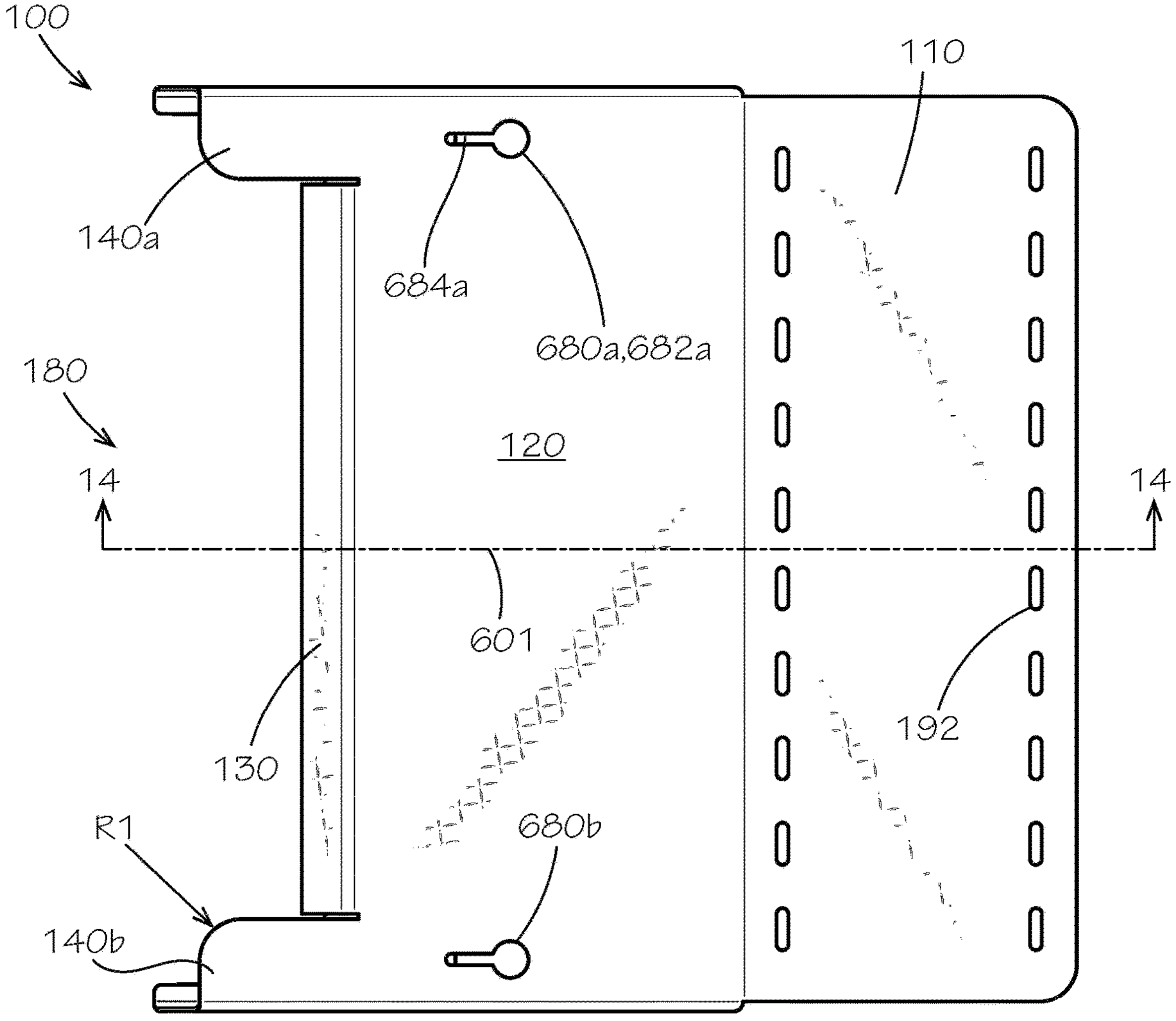
FIG. 13 is a top view of the ladder dock of FIG. 11.
Figure 14:
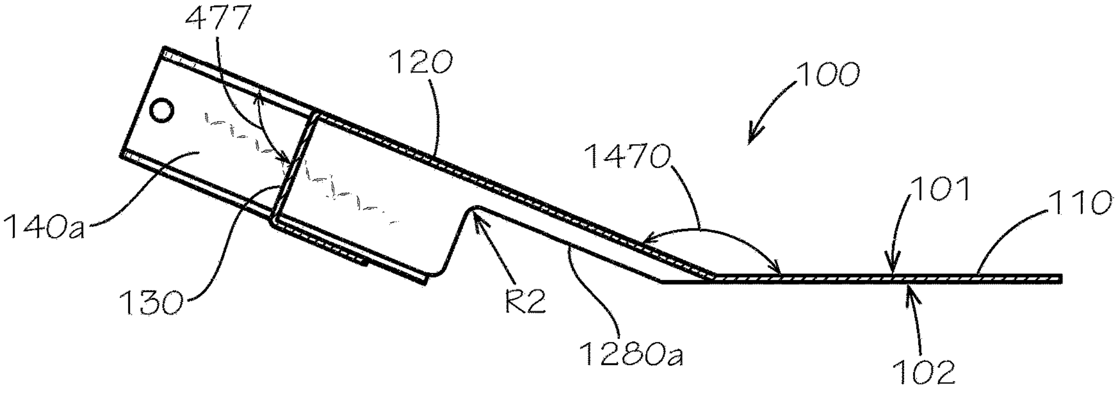
FIG. 14 is a side sectional view of the ladder dock of FIG. 11 taken along line 14-14 in FIG. 13.
Figure 15:
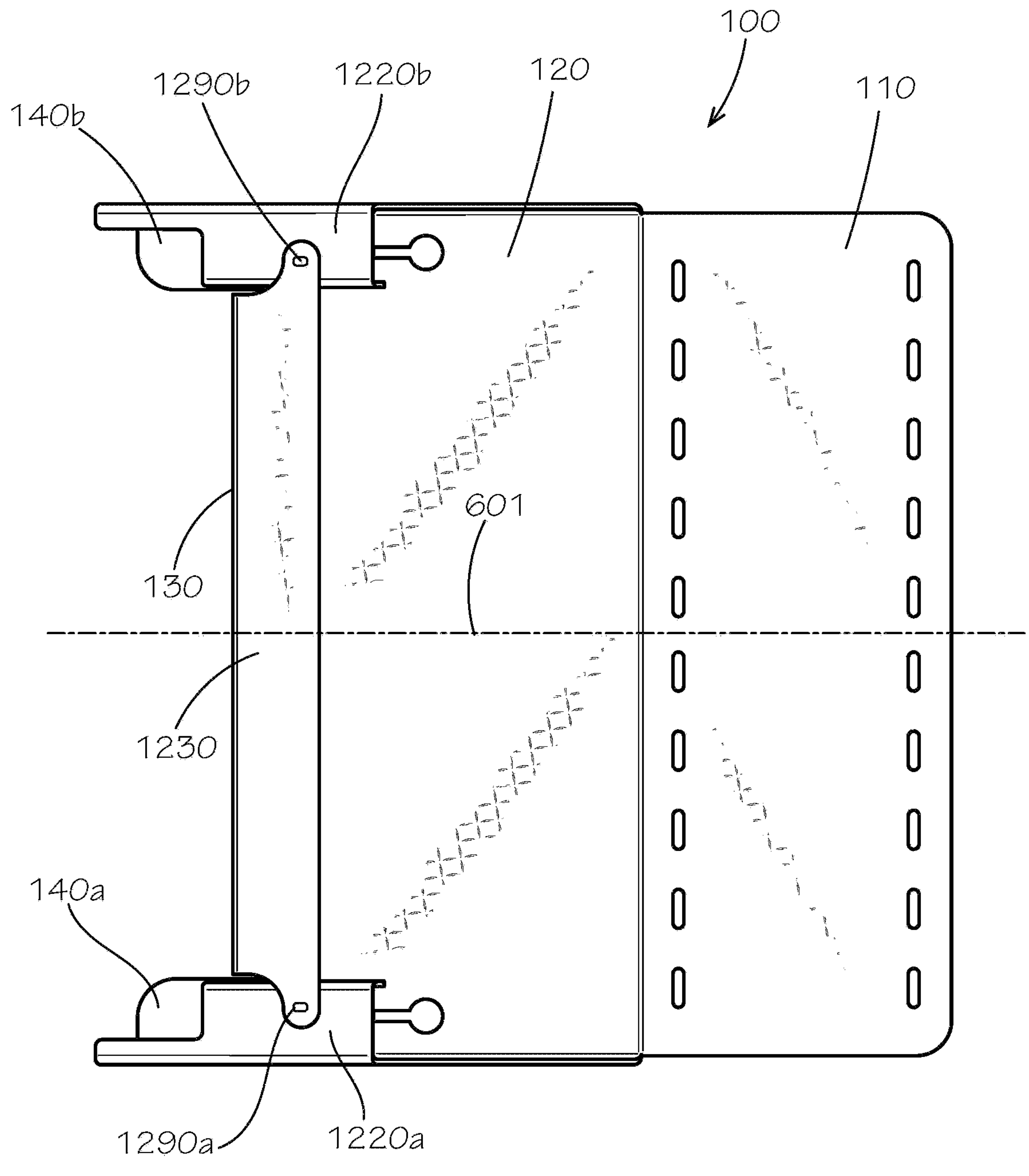
FIG. 15 is a bottom view of the ladder dock of FIG. 11.

FIGS. 13, 14, and 15 show respective top, side sectional, and bottom views of the ladder dock 100 shown in FIGS. 11 and 12. As shown in FIG. 14, the angle 477 between the connecting panel 120 and the ladder rest panel 130 can be at or about 90 degrees. In some aspects, either of the ladder 700 (shown in FIG. 7) and the ladder rest panel 130 can during use of the ladder dock 100 define a desired angle therebetween to provide an appropriate minimum ladder rest angle 470 (shown in FIG. 4) between the ladder 700 and the elevated structure 50 (shown in FIG. 1). The clearance notches 1280*a,b* (1280*b* shown in FIG. 12) can provide clearance for structure such as a gutter 1610 (shown in FIG. 18), which can be attached to the elevated structure 50 and might otherwise interfere with the ladder dock 100. As shown, the connecting panel 120 and the mounting panel 110 can define an angle 1470 therebetween.

As shown in FIGS. 16 and 17, the ladder dock 100 in further simplified forms can define a ladder notch 180 without the ladder rest panel 130 (shown in FIG. 1) or without even the ears 140*a,b*, and various instances of the bend line BL can be optional. More specifically, the ladder dock 100 can be formed with from a single blank without any bends or with as little as the one bend shown between the mounting panel 110 and the connecting panel 120. For example, as shown in FIG. 16, the ladder 700 (shown in FIG. 7) can be received within the ladder notch 180 formed by the connecting panel 120. As shown in FIG. 17, the rails 710*a,b* (shown in FIG. 7) can be received within a pair of ladder notches 180*a,b* formed by the connecting panel 120 and, optionally, a flange 1180 can catch on and secure one of the plurality of ladder rungs 720 (shown in FIG. 7). For any one or more of the aforementioned reasons, external radii or chamfers or internal radii can be formed at any intersection of the edges formed by the blank, and rigidity can be increased as desired by adding additional flanges, by increasing a thickness or gage of the raw material, or by shortening the dimensions of the panels.

FIG. 18 shows the ladder dock 100 and the ladder 700 in an installed condition as the ladder dock system 80 on the elevated structure 50, which as shown can be a sloped roof in accordance with one aspect of the current disclosure. Again, the ladder dock 100 can be secured to the elevated structure 50 using fasteners 1890 extending through openings 190 (shown in FIG. 1) defined in the mounting panel 110 such as the openings 192 (shown in FIG. 11). To cause the connecting panel 120 and the side panels 1110*a,b* (1110*a* shown in FIG. 11) to be oriented horizontally, the angle 1470 between the connecting panel 120 and the mounting panel 110 can be made equal to an angle 1670 between the surface 51 of the elevated structure 50, which can be the aforementioned roof, and the horizontal.

Figure 19:
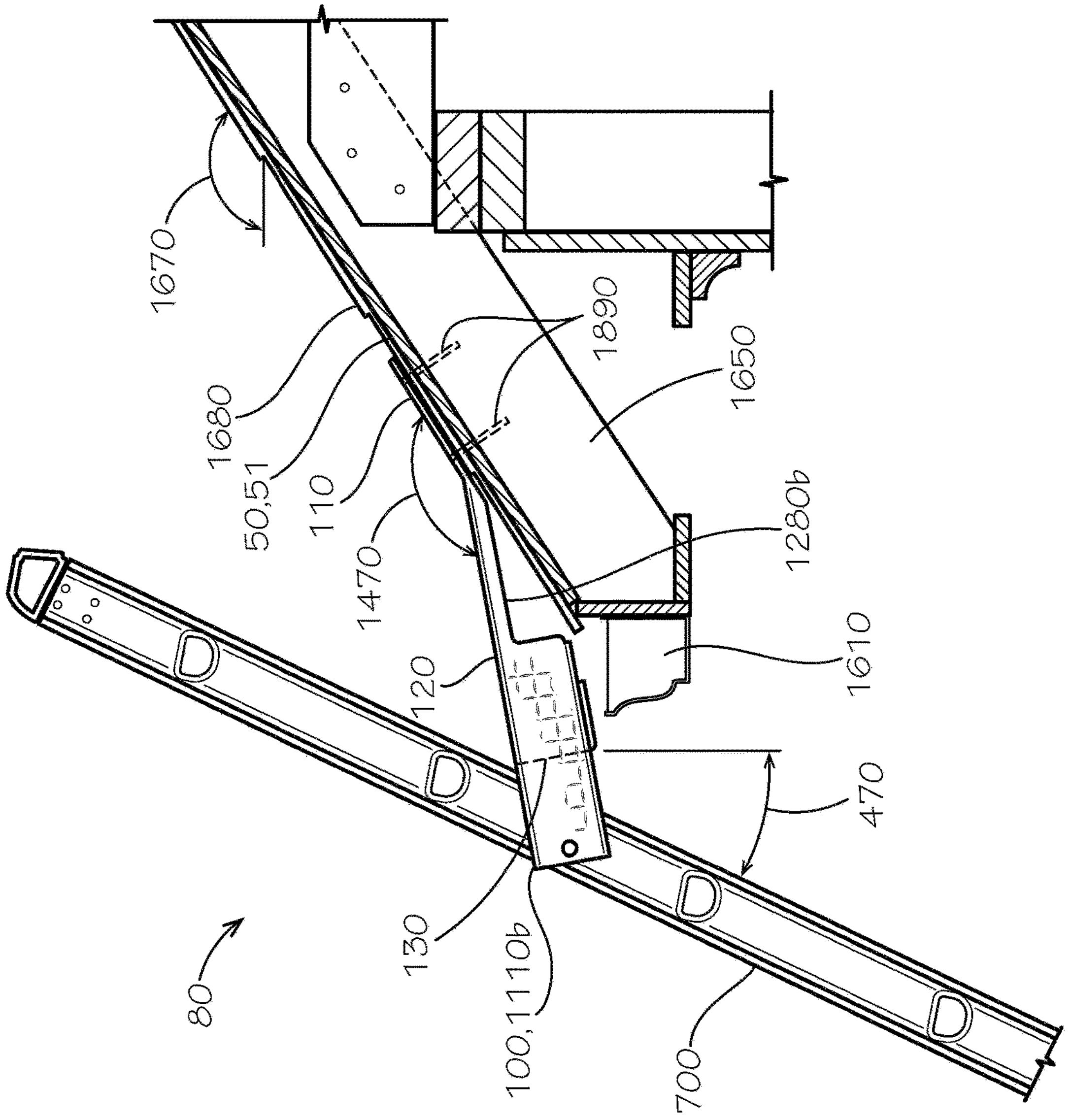
FIG. 19 is the ladder dock system of FIG. 10 in an installed condition on a sloped roof in accordance with another aspect of the current disclosure.

As shown in FIG. 19, it is not necessary that the connecting panel 120 and the side panels 1110*a,b* (1110*a* shown in FIG. 11) or any other portion of the ladder dock 100 be oriented horizontally, at least as long as the ladder dock 100 is secured to the elevated structure 50 and the ladder 700 can be received by the ladder dock 100. In some aspects, the ladder dock 100 can be installed further up or towards a center of the surface 51 of the elevated structure if necessary to avoid interference between the ladder dock and any portion of the elevated structure 50. In some aspects, including when the angle 1470 does not match the angle 1670 or in other cases, different versions of the mounting panel 110, each with a different value of the angle 1470, can be a separate part of the ladder dock 100 and joined to the connecting panel 120 or another portion of the ladder dock 100 with fasteners such as the fasteners 250 (shown in FIG. 2) and either the connecting panel 120 or the mounting panel 110 can define elongated openings such as the bracket mounting openings 194 (shown in FIG. 1). This can facilitate use of a certain common parts for the ladder dock 100. In some aspects, an intersection between the mounting panel 110 and the connecting panel 120 can define a joint about which one panel can rotate with respect to the other, and the angle 1470 can be set and locked as desired.

In some aspects, as shown in FIG. 18, the ladder dock 100 can be installed under the shingle layer or roof covering 1680 (shown in FIG. 19) on paneling 1660, which can be attached to the structural members 1650 of the elevated structure 50. In other aspects, as shown in FIG. 19, the ladder dock 100 can be installed above the roof covering 1680. In any case, any holes created in the roof covering 1680 or other portion of the elevated structure 50 in the process of securing the ladder dock 100 to the elevated structure 50 can be sealed or the roof covering 1680 and any other portions replaced in the area of the elevated structure 50 that is affected. The ladder dock 100 shown in FIGS. 18 and 19 is not necessarily to scale and relative to the ladder 700 and the gutter 1610 can be smaller or larger than shown.

Figure 20:
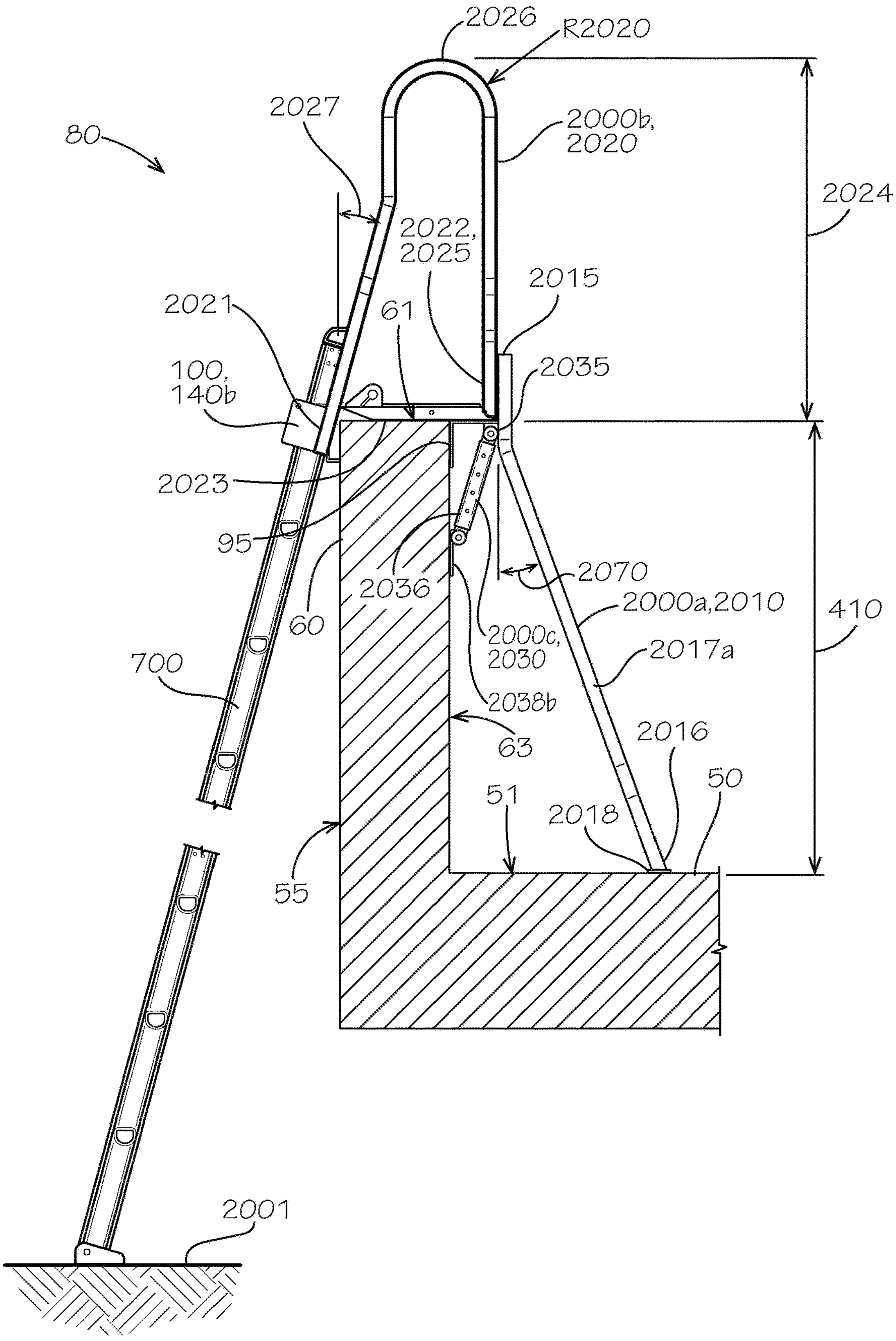
FIG. 20 is a side view of the ladder dock system of FIG. 10 comprising a parapet descent apparatus in an installed condition on a roof with a parapet in accordance with another aspect of the current disclosure.

FIGS. 20-23 show the ladder dock system 80 comprising the ladder 700, the ladder dock 100, the fall arrest system 1000, and/or four parapet descent apparatuses 2000*a,b,c,d* in an installed condition on an elevated structure 50 with a raised edge 60 shown as a parapet in accordance with various aspects of the current disclosure. FIG. 20 is a side view of the ladder dock system 80 comprising the ladder 700, the ladder dock 100, and the parapet descent apparatuses 2000*a,b,c* in an installed condition. As shown, each of the parapet descent apparatuses 2000*a,b,c* can be secured to the ladder dock 100 to facilitate a user's descent from a top surface 61 of the raised edge 60 down to the surface 51 of the elevated structure or down the ladder 700 to the lower surface 2001.

The parapet descent apparatus 2000*a* can comprise a parapet ladder 2010 extending from the top surface 61 of the parapet or raised edge 60 or from a position proximate to the top surface 61 of the parapet or raised edge 60 to the surface 51 of the elevated structure 50. The parapet ladder 2010 can define a first end 2015 proximate to the ladder dock 100 and a second end 2016 proximate to the surface 51. In some aspects, a portion of the parapet ladder 2010 between the first end 2015 and the second end 2016 can be angled with respect to the vertical by an angle 2070 to facilitate descent by a user. In some aspects, a portion of the parapet ladder 2010 between the first end 2015 and the second end 2016 can be oriented vertically. Feet 2018, which can be adjustable, can be attached to and can stabilize ladder rails 2017*a,b* (2017*b* shown in FIG. 21) and a base of the parapet ladder 2010 and the parapet ladder 2010 generally.

The parapet descent apparatus 2000*b* can comprise a guide rail 2020 extending vertically upward from the ladder dock 100. As shown, the guide rail 2020 can define a first end 2025 proximate to the ladder dock 100 and a second end 2026 distal from the ladder dock 100. The guide rail 2020 can define a rail height 2024 measured from the top surface 61, which can be set to satisfy applicable ergonomic and/or safety requirements. As shown, the first end 2025 of the guide rail 2020 can comprise two ends 2021,2022, either or both of which can be secured to the ladder dock 100. As shown, the end 2021 can be secured to the ear 140*b* with fasteners (not shown) and the end 2022 can be secured with fasteners (not shown) to a portion of the ladder dock 100 distal from the ear 140*b*. The guide rail 2020 can approximately define an upside-down "U" shape or "V" shape. In some aspects, as shown, a horizontal member 2023 can extend from the end 2021 to the end 2022 and the guide rail 2020 can thereby form a closed shape. A portion of the guide rail 2020 proximate to the end 2021 can be angled with respect to the vertical by an angle 2027, and the second end 2026 or top of the guide rail 2020 can be rounded and can define a radius R2020 as shown.

The parapet descent apparatus 2000*c* can comprise a support arm 2030, which can be configured to mount to a side surface 63 of the parapet or raised edge 60 and can extend from the ladder dock 100 and thereby stabilize the ladder dock 100. As shown, the support arm 2030 can define a first end 2035 proximate to the ladder dock 100 and a second end 2036 distal from the ladder dock 100. The support arm 2030 can comprise a mounting bracket at either or both ends 2035,2036. As shown, the support arm 2030 can comprise a mounting bracket 2038*b* at the second end 2036, which can be secured to the side surface 63 with fasteners (not shown). The support arm 2030 can support any loads applied to the ladder dock, including from the parapet ladder 2010 and when the ladder dock 100 overhangs at least in part in cantilever fashion past the raised edge 60 and beyond the top surface 61.

Figure 21:
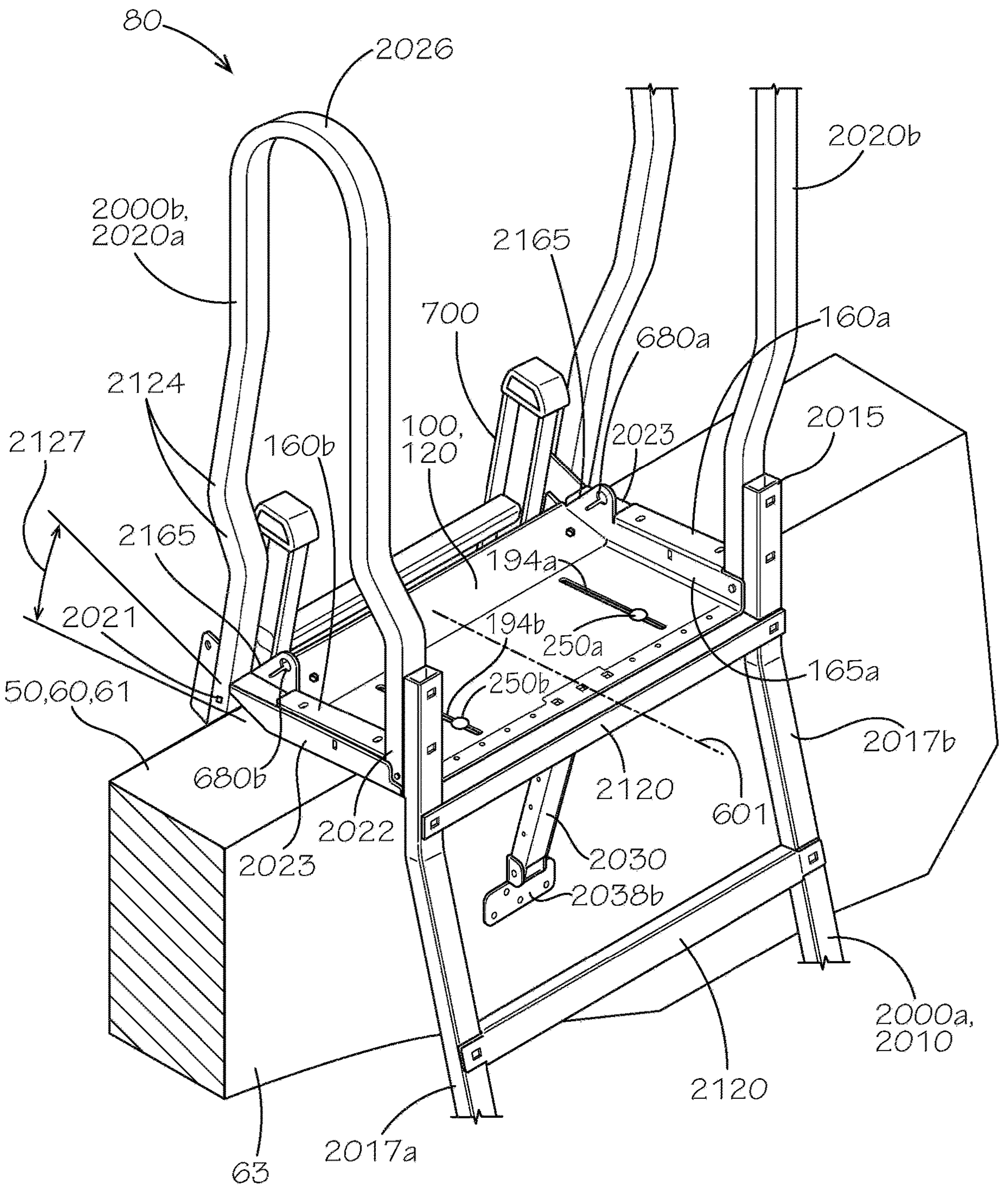
FIG. 21 is a rear perspective view of the ladder dock system of FIG. 20.

FIG. 21 is a rear perspective view of the ladder dock system 80 of FIG. 20. The parapet ladder 2010 can comprise one or more rungs 2120 extending from the first ladder rail 2017*a* to the second ladder rail 2017*b*. As shown, the first end 2015 of the parapet ladder 2010 can be secured to guide rails 2020*a,b*, one of which can be positioned and secured on each side of the ladder dock 100. As shown, guide rails such as either or both of the guide rails 2020*a,b* can define bends 2124 resulting in the second end 2026 or top portion of the guide rails 2020*a,b* being offset away from the line of symmetry 601 of the ladder dock 100. Since a user of the ladder dock system 80 can be accompanied by tools or equipment, such an offset on one or both sides can facilitate passage across the ladder dock 100 from the ladder 700 to the parapet ladder 2010 by increasing a space or distance between the guide rails 2020*a,b*.

As shown, in a similar way that the connecting panel 120 can be angled, an end of the horizontal member 2023 of the guide rail 2020*a* and any other of the guide rails 2020 can be angled with respect to the horizontal at an angle 2127 to provide clearance for the lip 65 (shown in FIG. 4) when present. The ladder dock 100 can be secured to the horizontal member 2023 of each of the guide rails 202*a,b* with fasteners (not shown) extending through the auxiliary panels 160*a,b* and the corresponding horizontal members 2023. As shown, the retaining openings 680*a,b* can be defined in the connecting panels 165*a,b* (165*b* shown in FIG. 2) and, more specifically, in tabs 2165 formed from same.

Figure 22:
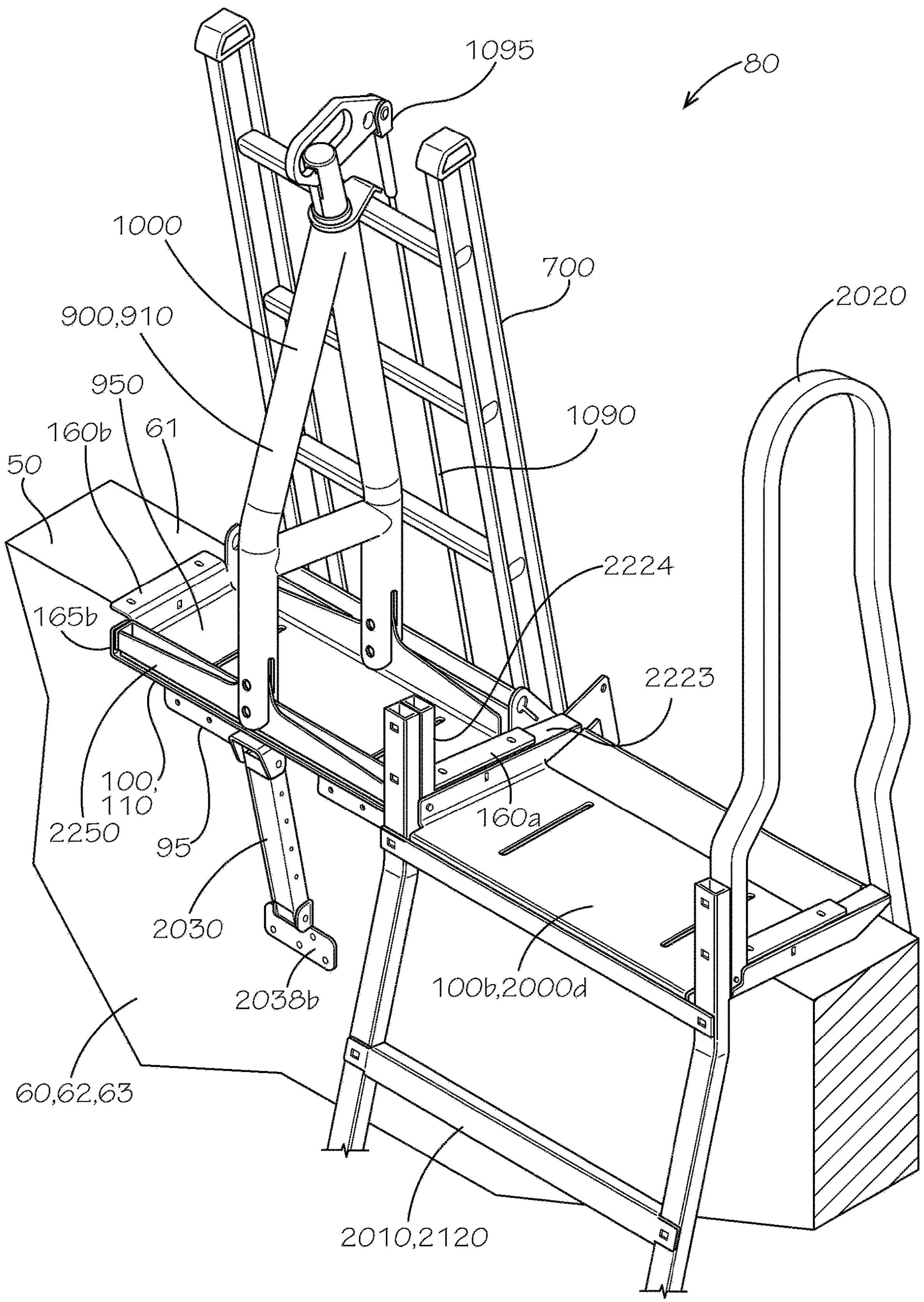
FIG. 22 is a rear perspective view of the ladder dock system of FIG. 20 and the fall arrest system of FIG. 10 in accordance with another aspect of the current disclosure.

FIG. 22 is a rear perspective view of the ladder dock system 80 and the fall arrest system 1000 in accordance with another aspect of the current disclosure. As shown and as previously described, the upper anchor 910 of the fall arrest device 900 of the fall arrest system 1000 can be secured to the ladder dock 100. The base 950 of the upper anchor 910 can comprise a reinforcement member 2250, including at an end of the ladder dock 100 distal from the ladder 700. The reinforcement member 2250 can be secured to one or more adjoining panels such as, for example and without limitation, the mounting panel 110, the connecting panels 165*a,b* (165*a* shown in FIG. 21), and the auxiliary panels 160*a,b*, through and using any one or more of the openings shown.

As shown, a center of the parapet ladder 2010 can be offset from a center of the ladder dock 100, including when the fall arrest device 900 is secured to the ladder dock 100. Also as shown, a parapet descent apparatus 2000*d* can comprise a ladder dock 100*b*, which can be a second ladder dock and can incorporate any or all of the same features as defined in or comprised in the ladder dock 100, and which can be positioned adjacent to the ladder dock 100. Any of the parapet ladder 2010, the guide rail 2020 (on one side of the ladder dock 100*b* as shown or on both sides of the ladder dock 100*b*), and the support arm 2030 (shown attached to the ladder dock 100) can be mounted to the second ladder dock 100*b* and facilitate a user's passage over the wall 62 and down the ladder 700 or the parapet ladder 2010. The second ladder dock 100*b* can be secured to the ladder dock 100, including with fasteners extending through panels such as the auxiliary panel 160*a* of the ladder dock 100 and a similar auxiliary panel (not shown) of the ladder dock 100*b* or a horizontal member 2223 shown, which can be used independent of a guide rail. As shown, the ladder dock 100*b* can comprise a vertical member 2224, to which the parapet ladder 2010 can be secured with fasteners (not shown). The ladder dock 100*b* itself can be attached to the wall 62 in a similar fashion as the ladder dock 100, with or without the bracket 95 (shown attached to the ladder dock 100).

Figure 23:
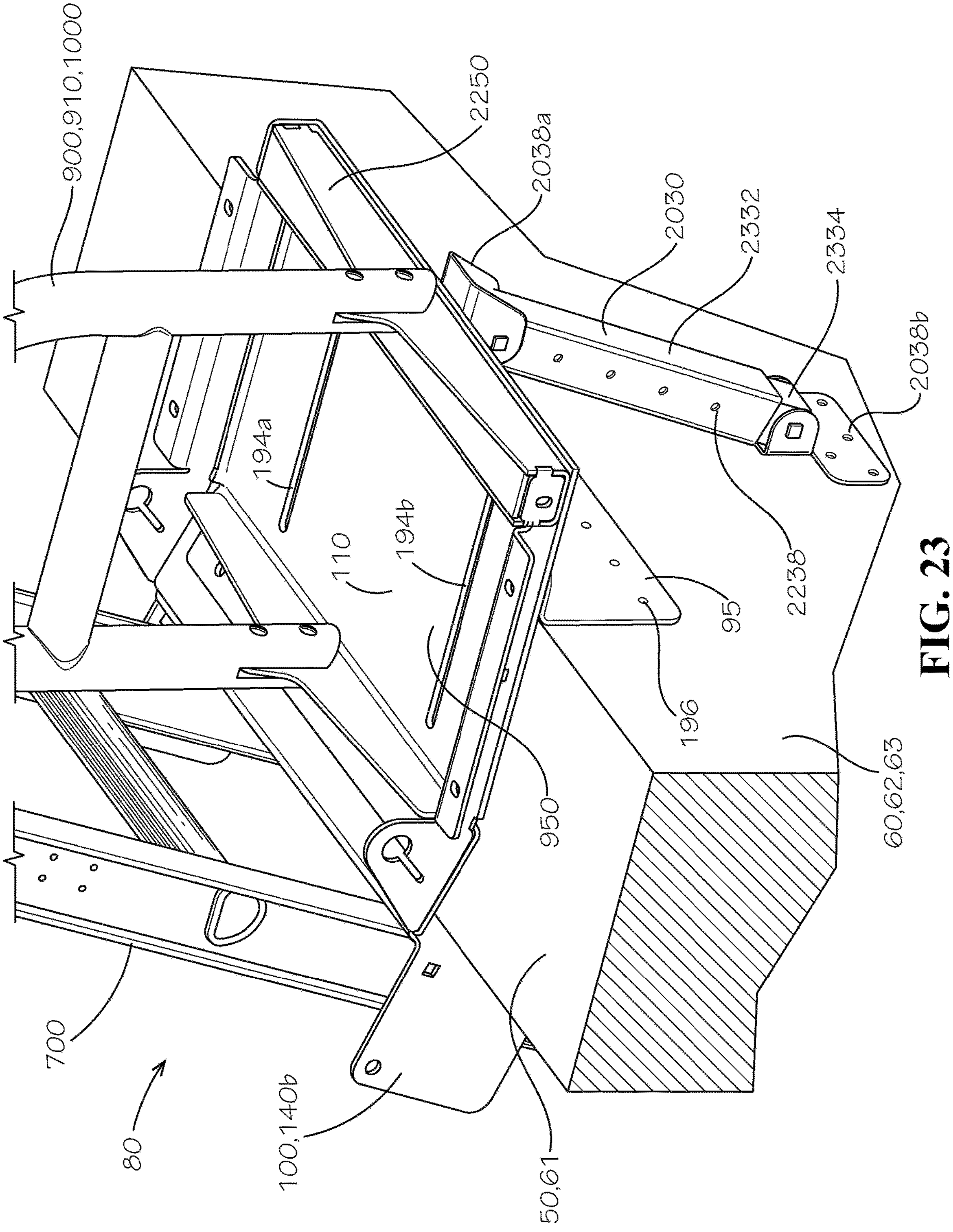
FIG. 23 is a side rear perspective view of the ladder dock of FIG. 10 in accordance with another aspect of the current disclosure.

FIG. 23 is a side rear perspective view of the ladder dock system 80 comprising the ladder dock 100 together with the upper anchor 910 of the fall arrest device 900 in accordance with another aspect of the current disclosure. As shown, the support arm 2030 can be secured to the side surface 63 of the wall 62 with the mounting bracket 2038*b*. The support arm 2030 can also be secured to the ladder dock 100 with the mounting bracket 2038*a*. The support arm 2030 can comprise a first extension member 2332 and, optionally, a second extension member 2334 received within, as shown, or about the first extension member 2332. Fasteners (not shown) can extend through holes 2238 defined in the first extension member 2332 and holes (not shown) in the second extension member 2334 for locking an extension setting or length of the support arm 2030. As shown, the mounting brackets 2038*a,b* can be hingedly mounted to the first extension member 2332 and the second extension member 2334, respectively. The mounting bracket 2038*a* can be mounted to either or both of the mounting panel 110 of the ladder dock 100 and the reinforcement member 2250 of the base 950 of the fall arrest device 900. In some aspects, as shown, the support arm 2030 can be used together with the bracket 95, which can define mounting openings 196 therein.

Any of the parapet descent apparatuses 2000*a,b,c,d* including, for example and without limitation, the parapet ladder 2010, the guide rails 2020, the support arm 2030, or the ladder dock 100*b* can be formed at least in part from tubing members, which can be circular or, as shown, approximately square in cross-section (square except for radiused corners as shown), The mounting brackets 2038*a,b* can be monolithically formed from a blank.

A method of using the ladder dock 100 can comprise securing the ladder dock 100 to the elevated structure 50. The method can further comprise positioning the ladder 700 and, more specifically, inserting the ladder 700 in the ladder notch 180 defined by the ladder dock 100. The method can comprise identifying the type and pitch or angle of slope, if any, of the surface 51 of the elevated structure 50. The method can comprise identifying the absence or presence of roof edge features such as the gutter 1610. The method can comprise identifying a position and orientation of each of one or more structural members 1650 behind or under the surface 51 of the elevated structure 50, which can be, for example and without limitation, beams or roof joists. The method can comprise securing the ladder dock 100 and, more specifically, the mounting panel 110 to the surface 51. More specifically, securing the ladder dock 100 to the surface 51 can comprise securing fasteners through the surface mounting openings 192, through the surface 51, and into the aforementioned structural members 1650 of the elevated structure 50. In some aspects, securing the ladder dock 100 to the elevated structure 50 can comprise securing the ladder dock 100 to a parapet of the elevated structure 50 in one or more axes. More specifically, in some aspects, securing the ladder dock 100 to the elevated structure 50 can comprise securing the ladder dock 100 to the parapet of the elevated structure 50 directly with fasteners installed through the ladder dock 100 into to the elevated structure. In some aspects, securing the ladder dock 100 to the elevated structure 50 can comprise securing the ladder dock 100 by mechanically clamping the ladder dock 100 to the parapet of the elevated structure 50. The method can comprise extending the ladder 700 to provide the proper reach towards and beyond the ladder dock 100 as appropriate. The method can comprise securing the ladder 700 to the ladder dock 100 with one or more of the retaining fasteners 150*a, b*.

While not restricted to such use, in some aspects the ladder dock 100 of FIGS. 1-10 can, for example and without limitation only, be used on the elevated structure 50 of a commercial building, including a commercial building with a flat roof. Similarly, the ladder dock 100 of FIGS. 11-16 can, for example and without limitation only, be used on the elevated structure 50 of a residential building, including a residential building with a sloped or pitched roof. Commercial building structures and methods, however, can be used in buildings that are, as a technical matter, residential in nature; and residential building structures and methods can be used in buildings that are, as a technical matter, commercial in nature.

Any of the structures of the ladder dock 100 can be formed from a non-metallic material such as, for example and without limitation, a reinforced fiberglass or polymer or from a metallic material such as steel. A paint coating or powder coating or use of corrosion resistant materials can facilitate use of the ladder dock 100 for extended periods outside without degradation. A portion or all of the ladder dock 100 can define a surface texture such as a diamond tread pattern for aesthetic reasons or for functional reasons such as to improve skid resistance when a user of the ladder dock 100 steps on the ladder dock 100.

One should note that conditional language, such as, among others, "can," "could," "might," or "may," unless specifically stated otherwise, or otherwise understood within the context as used, is generally intended to convey that certain aspects include, while other aspects do not include, certain features, elements and/or steps. Thus, such conditional language is not generally intended to imply that features, elements and/or steps are in any way required for one or more particular aspects or that one or more particular aspects necessarily comprise logic for deciding, with or without user input or prompting, whether these features, elements and/or steps are included or are to be performed in any particular aspect.

It should be emphasized that the above-described aspects are merely possible examples of implementations, merely set forth for a clear understanding of the principles of the present disclosure. Any process descriptions or blocks in flow diagrams should be understood as representing modules, segments, or portions of code which comprise one or more executable instructions for implementing specific logical functions or steps in the process, and alternate implementations are included in which functions may not be included or executed at all, may be executed out of order from that shown or discussed, including substantially concurrently or in reverse order, depending on the functionality involved, as would be understood by those reasonably skilled in the art of the present disclosure. Many variations and modifications may be made to the above-described aspect(s) without departing substantially from the spirit and principles of the present disclosure. Further, the scope of the present disclosure is intended to cover any and all combinations and sub-combinations of all elements, features, and aspects discussed above. All such modifications and variations are intended to be included herein within the scope of the present disclosure, and all possible claims to individual aspects or combinations of elements or steps are intended to be supported by the present disclosure.

That which is claimed is:

1. A ladder dock comprising:

a planar mounting panel defining an upper surface and a lower surface, the lower surface of the mounting panel configured to contact and be secured to a surface of an elevated structure;

a planar connecting panel defining an upper surface and a lower surface, the connecting panel extending from the mounting panel and angled with respect to the mounting panel, the connecting panel angled upward with respect to the mounting panel by a bend angle, an angle between the upper surface of the mounting panel and the upper surface of the connecting panel being less than 180 degrees, the connecting panel defining a first ear and a second ear, each of the first ear and the second ear extending in a direction away from the mounting panel, each of the first ear and the second ear being coplanar with the connecting panel, the first ear and the second ear defining a ladder notch therebetween, the ladder notch sized to receive and fix a position of a ladder relative to the ladder dock;

a first side panel extending from and angled with respect to a first side of the connecting panel;

a second side panel extending from and angled with respect to a second side of the connecting panel and positioned opposite from the first side panel, each of the first side panel and the second side panel configured to reinforce the connecting panel;

a ladder rest panel extending from the connecting panel and angled with respect to the connecting panel; and a strap panel extending from the ladder rest panel and angled with respect to the ladder rest panel, the strap panel being fastened to a pair of flanges extending respectively from the first side panel and the second side panel;

wherein the ladder dock is configured to be formed from a single blank.

2. The ladder dock of claim 1, wherein the mounting panel defines a plurality of openings configured to receive a plurality of fasteners for mounting the ladder dock to the elevated structure.

3. The ladder dock of claim 1, wherein the connecting panel further defines a pair of retaining openings, each of the pair of retaining openings configured to receive a retaining fastener for securing the ladder to the ladder dock, a first retaining opening and a second retaining opening of the pair of retaining openings positioned on opposite sides of the ladder dock.

4. The ladder dock of claim 3, wherein each of the pair of retaining openings defines a keyhole shape comprising a larger portion and a smaller portion.

5. The ladder dock of claim 1, wherein each of the first side panel and the second side panel defines a notch adjacent to the corresponding side panel.

6. The ladder dock of claim 1, wherein the pair of flanges comprises:

a first flange extending from and angled with respect to the first side panel, the first flange configured to reinforce the first side panel; and a second flange extending from and angled with respect to the second side panel, the second flange configured to reinforce the second side panel.

7. The ladder dock of claim 1, wherein the connecting panel is bent upward with respect to the mounting panel and the ladder rest panel is bent downward with respect to the connecting panel when the upper surface of the connecting panel is facing upward.

8. The ladder dock of claim 1, wherein the mounting panel and the ladder dock terminate in a rearward direction at a rear edge of the mounting panel.

9. The ladder dock of claim 1, wherein:

the first side panel is angled downward with respect to the first side of the connecting panel; and the second side panel is angled downward with respect to the second side of the connecting panel.

10. The ladder dock of claim 1, wherein the strap panel is fastened with a separate fastener to the pair of flanges extending respectively from the first side panel and the second side panel, the separate fastener being one of a rivet and a screw.

11. A ladder dock system comprising:

a ladder dock comprising:

a planar mounting panel defining an upper surface and a lower surface, the lower surface of the mounting panel configured to contact and be secured to a surface of an elevated structure, the mounting panel and the ladder dock terminating in a rearward direction at a rear edge of the mounting panel; and a planar connecting panel defining an upper surface and a lower surface, the connecting panel extending from the mounting panel and angled with respect to the mounting panel, the connecting panel angled upward with respect to the mounting panel by a bend angle, an angle between the upper surface of the mounting panel and the upper surface of the connecting panel being less than 180 degrees, the connecting panel defining a first ear and a second ear, each of the first ear and the second ear extending in a direction away from the mounting panel, each of the first ear and the second ear being coplanar with the connecting panel, and the first ear and the second ear defining a ladder notch therebetween;

a first side panel extending from and angled with respect to a first side of the connecting panel;

a second side panel extending from and angled with respect to a second side of the connecting panel and positioned opposite from the first side panel, each of the first side panel and the second side panel configured to reinforce the connecting panel;

a ladder rest panel extending from the connecting panel and angled with respect to the connecting panel; and a strap panel extending from the ladder rest panel and angled with respect to the ladder rest panel, the strap panel being fastened to a pair of flanges extending respectively from the first side panel and the second side panel;

wherein the ladder dock is configured to be formed from a single blank; and a ladder configured to provide access to the elevated structure and sized to rest against the ladder dock, and the ladder notch sized to receive and fix a position of the ladder relative to the ladder dock.

12. The ladder dock system of claim 11, further comprising a flexible retaining fastener securing the ladder to the ladder dock, the retaining fastener, the connecting panel further defining a retaining opening, the retaining opening defining a keyhole shape comprising a larger portion and a smaller portion.

13. The ladder dock system of claim 11, wherein the connecting panel is bent upward with respect to the mounting panel and the ladder rest panel is bent downward with respect to the connecting panel when the upper surface of the connecting panel is facing upward.

14. The ladder dock system of claim 11, wherein the connecting panel further defines a pair of retaining openings, each of the pair of retaining openings configured to receive a retaining fastener for securing the ladder to the ladder dock, a first retaining opening and a second retaining opening of the pair of retaining openings positioned on opposite sides of the ladder dock.

15. The ladder dock system of claim 14, wherein each of the pair of retaining openings defines a keyhole shape comprising a larger portion and a smaller portion.

16. A method of forming the ladder dock of claim 1, the method comprising forming the mounting panel, the connecting panel, the first side panel, the second side panel, the ladder rest panel, and the strap panel from the single blank, the single blank being formed from sheet metal.

* * * * *